(12) United States Patent
Mianji

(10) Patent No.: US 8,412,707 B1
(45) Date of Patent: Apr. 2, 2013

(54) METHOD AND APPARATUS FOR DISTRIBUTING CONTENT

(75) Inventor: Marty Mianji, Lake Oswego, OR (US)

(73) Assignee: Ustringer LLC, Lake Oswego, OR (US)

( * ) Notice: Subject to any disclaimer, the term of this patent is extended or adjusted under 35 U.S.C. 154(b) by 293 days.

(21) Appl. No.: 12/485,037

(22) Filed: Jun. 15, 2009

Related U.S. Application Data

(60) Provisional application No. 61/061,579, filed on Jun. 13, 2008.

(51) Int. Cl.
*G06F 17/30* (2006.01)

(52) U.S. Cl. ........ 707/736; 707/758; 707/769; 715/810; 715/853

(58) Field of Classification Search ............... 707/758, 707/769, 736; 715/810, 853
See application file for complete search history.

(56) References Cited

U.S. PATENT DOCUMENTS

| | | | |
|---|---|---|---|
| 6,925,608 B1 | 8/2005 | Neale et al. | |
| 7,287,029 B1* | 10/2007 | Craft et al. ........................... | 1/1 |
| 7,505,989 B2 | 3/2009 | Gardner et al. | |
| 7,664,760 B2* | 2/2010 | Christian et al. ........... | 707/999.1 |
| 7,685,198 B2 | 3/2010 | Xu et al. | |
| 7,836,411 B2* | 11/2010 | Plow et al. ................... | 715/811 |
| 7,912,844 B2* | 3/2011 | Boyle et al. ................... | 707/754 |
| 8,099,429 B2 | 1/2012 | Deyo et al. | |
| 8,219,555 B1* | 7/2012 | Mianji ........................... | 707/736 |
| 2001/0039578 A1* | 11/2001 | Tokumaru et al. ............ | 709/223 |
| 2002/0091696 A1* | 7/2002 | Craft et al. ....................... | 707/10 |
| 2002/0107829 A1* | 8/2002 | Sigurjonsson et al. ........... | 707/1 |
| 2003/0135725 A1 | 7/2003 | Schirmer et al. | |
| 2003/0167283 A1 | 9/2003 | Remsen et al. | |
| 2005/0010867 A1 | 1/2005 | Igata et al. | |
| 2007/0038995 A1* | 2/2007 | Boyle et al. .................... | 717/177 |
| 2007/0067279 A1 | 3/2007 | Bonabeau et al. | |
| 2007/0078832 A1* | 4/2007 | Ott et al. ........................... | 707/3 |
| 2007/0150519 A1 | 6/2007 | Palacios | |
| 2007/0162411 A1 | 7/2007 | Kupershmidt et al. | |
| 2007/0174247 A1 | 7/2007 | Xu et al. | |
| 2008/0016052 A1 | 1/2008 | Frieden | |
| 2008/0016072 A1 | 1/2008 | Frieden et al. | |
| 2008/0016098 A1* | 1/2008 | Frieden et al. ................ | 707/102 |
| 2008/0040181 A1 | 2/2008 | Freire et al. | |

(Continued)

OTHER PUBLICATIONS

Chen, Hao, et al., "Bringing Order to the Web: Automatically Categorizing Search Results", CHI 2000, CHI Letters, vol. 2, Issue 1, Apr. 1-6, 2000, pp. 145-152.*

(Continued)

*Primary Examiner* — Jean M Corrielus
(74) *Attorney, Agent, or Firm* — Adeli & Tollen, LLP

(57) ABSTRACT

Some embodiments provide a system that provides a user interface (UI) for categorizing content. The UI includes (i) a first UI tool for receiving identification of a set of tags and associating the set of tags to the content and (ii) a second UI tool for receiving identifications of relationships between the tags within the set of tags in order to describe the content. In some embodiments, the set of tags includes one or more tag chains that are based on a hierarchy of the tags within the set of tags. In some embodiments, the set of tags includes one or more tag chains that are based on a set of operators. Each operator in the set identifies a relationship between two or more tags within the set of tags. In some embodiments, the UI also includes a UI tool for receiving content or presenting the list of content items through a communications network. In various embodiments, the communications network may be a network of networks (e.g., the Internet), a private network, a public network, a wireless cellular network, etc.

3 Claims, 29 Drawing Sheets

U.S. PATENT DOCUMENTS

| | | | |
|---|---|---|---|
| 2008/0097816 A1 | 4/2008 | Freire et al. | |
| 2008/0114778 A1 | 5/2008 | Siegel | |
| 2008/0133488 A1 | 6/2008 | Bandaru et al. | |
| 2008/0140679 A1 | 6/2008 | Deyo et al. | |
| 2008/0172399 A1 | 7/2008 | Chi et al. | |
| 2008/0256443 A1* | 10/2008 | Li et al. | 715/700 |
| 2009/0012991 A1* | 1/2009 | Johnson et al. | 707/103 R |
| 2009/0043781 A1 | 2/2009 | Kim et al. | |
| 2009/0049019 A1 | 2/2009 | Su et al. | |
| 2009/0064093 A1* | 3/2009 | Boyle et al. | 717/105 |
| 2009/0083278 A1* | 3/2009 | Zhao et al. | 707/10 |
| 2009/0164267 A1* | 6/2009 | Banatwala et al. | 705/7 |
| 2009/0164884 A1 | 6/2009 | Watson | |
| 2009/0172510 A1 | 7/2009 | Schachter | |
| 2009/0198642 A1 | 8/2009 | Akkiraju et al. | |
| 2009/0216867 A1* | 8/2009 | Pusateri et al. | 709/222 |
| 2009/0222400 A1 | 9/2009 | Kupershmidt et al. | |
| 2009/0281970 A1* | 11/2009 | Mika et al. | 706/12 |
| 2010/0088583 A1 | 4/2010 | Schachter | |
| 2010/0262949 A1* | 10/2010 | Jacobsen et al. | 717/105 |

OTHER PUBLICATIONS

Xu, Zhichen, et al., "Towards the Semantic Web: Collaborative Suggestions", Proc. of the Collaborative Web Tagging Workshop at the 15th International World Wide Conf., CiteSeer, © 2006, 8 pages.*

Marchetti, Andrea, et al., "SemKey: A Semantic Collaborative Tagging System", WWW 2007, Banff, Canada, May 8-12, 2007, 9 pages.*

Makris, Christos, et al., "Category ranking for personalized search", Data and Knowledge Engineering, vol. 60, Issue 1, Jan. 2007, pp. 109-125.*

Dumais, Susan, et al., "Optimizing Search by Showing Results in Context", SIGCHI '01, Seattle, WA, Mar. 31-Apr. 4, 2001, pp. 277-284.*

U.S. Appl. No. 12/485,036, filed Jun. 15, 2009, Mianji, Marty.

U.S. Appl. No. 12/485,039, filed Jun. 15, 2009, Mianji, Marty.

U.S. Appl. No. 13/042,440, filed Mar. 7, 2011 Mianji, Marty.

Portions of prosecution history of U.S. Appl. No. 12/485,036, Oct. 28, 2011, Mianji, Marty.

Portions of prosecution history of U.S. Appl. No. 12/485,039, filed Aug. 31, 2011, Mianji, Marty.

Abolhassani, Hassan, et al., "On Ontology Alignment Experiments," Webology, Sep. 2006, pp. 1-22, vol. 3, No. 3.

Khan, Latifur, et al., "Retrieval effectiveness of an ontology-based model for information selection", The VLDB Journal, 2004, pp. 71-85, vol. 13.

Laniado, David, et al., "A Semantic Tool to Support Navigation in a Folksonomy", HT '07, Sep. 10-12, 2007, pp. 153-154, Manchester, United Kingdom.

Laniado, David, et al., "Using WordNet to turn a folksonomy into a hierarchy of concepts", Proc. of the 4th Italian Semantic Web Workshop, 2007, pp. 192-201, Bari, Italy.

Mikroyannidis, Alexander, "Toward a Social Semantic Web", Computer, Nov. 2007, pp. 113-115, vol. 40, Issue 11, IEEE Computer Society.

Updated portions of prosecution history of U.S. Appl. No. 12/485,036, Jan. 10, 2012, Mianji, Marty.

Updated portions of prosecution history of U.S. Appl. No. 12/485,039, Feb. 28, 2012, Mianji, Marty.

Abowd, Gregory D., et al., "The Family Video Archive: An annotation and browsing environment for home movies", MIR '03, Nov. 7, 2003, pp. 1-8, Berkeley, CA.

Author Unknown, The American Heritage College Dictionary, 4th Edition, Month Unknown, 2002, pp. 914 and 1072, Houghton Mifflin Co., Boston, MA.

Author Unknown, "Hyponymy", Wikipedia, downloaded on Feb. 10, 2012 from: http://en.wikipedia.org/wiki/Hyponymy, 2 pages.

Author Unknown, "Microsoft Computer Dictionary", 5th Edition, Month Unknown, 2002, pp. 27, 67-69, 199-200, 368, and 381, Microsoft Press, Redmond, WA.

Brooks, Christopher H., et al., "Improved Annotation of the Blogosphere via Autotagging and Hierarchical Clustering", WWW 2006, May 23-26, 2006, pp. 625-631, Edinburgh, Scotland.

Kohlschutter, Christian, et al., "Using Link Analysis to Identify Aspects in Faceted Web Search", SIGIR 2006 Workshop on Faceted Search, Aug. 10, 2006, pp. 1-5, Seattle, WA.

Krulwich, Bruce, et al., "Learning user information interests through the extraction of semantically significant phrases", AAAI Technical Report SS-96-05, Month Unknown, 1996, AAAI, pp. 110-112.

Markines, Ben, et al., "Bookmark Hierarchies and Collaborative Recommendation", Proc. AAAI Conf., Month Unknown, 2006, pp. 1-6.

* cited by examiner

*Figure 18*

METHOD AND APPARATUS FOR DISTRIBUTING CONTENT

CLAIM OF BENEFIT TO PRIOR APPLICATION

This application claims the benefit of U.S. Provisional Application 61/061,579, entitled "Method and Apparatus for an Online Marketplace for News Content", filed Jun. 13, 2008, which is incorporated herein by reference.

BACKGROUND OF THE INVENTION

Recent significant shifts in technology, business, and demographics have greatly disrupted the traditional means by which content (e.g., news) is delivered and consumed. In addition to the traditional means by which news is disseminated, consumers of news now have several alternative choices from which to come up to speed with the latest happenings and occurrences. For instance, there are approximately fifty million 'blogs' on the Internet that disseminate news related information. Some such blogs claim readerships as large as many traditional news outlets, such as newspapers.

New commercial players further impact the news consumed by many viewers and readers. These commercial players leverage their technology-based offerings in the areas of news aggregation, news personalization, news content brokering, news content discovery, and reader edited online news sites. This has led to a distinguishable gap between Traditional Media (often referred to as Corporate Media) and the so-called Alternative Media. The Traditional Media companies which still employ most of the professional journalists (experts at gathering, fact checking, and editing the news) have very little choice but to erase this gap if they are to survive as viable businesses.

Therefore, there is a need to synergize the Traditional Media with the Alternative Media. Moreover, there is a need to provide such synergy through an automated and accessible interface whereby news producers are able to quickly and efficiently make available their content to news distributors. New distributors should then be able to quickly acquire the content and disseminate the content according to what content is deemed valuable, accurate, newsworthy, etc.

An automated system of organizing and distributing news can also have applications for searching for and delivering other searchable content which can include documents (e.g., articles, websites, news, books, etc.), video (e.g., movies, documentaries shows or any other professional or armature video clips), or music (e.g., songs, albums, etc.).

SUMMARY OF INVENTION

Some embodiments provide a system that provides a user interface (UI) for categorizing content. The UI includes (i) a first UI tool for receiving identification of a set of tags and associating the set of tags to the content and (ii) a second UI tool for receiving identifications of relationships between the tags within the set of tags in order to describe the content. In some embodiments, the set of tags includes one or more tag chains that are based on a hierarchy of the tags within the set of tags. In some embodiments, the set of tags includes one or more tag chains that are based on a set of operators. Each operator in the set identifies a relationship between two or more tags within the set of tags.

Some embodiments provide a system that provides a UI for delivering content to a content reviewer. The UI includes (i) a first UI tool for receiving a user query and for searching a set of content items based on the user query, (ii) a second UI tool for retrieving a set of tags associated with each particular content item, and (iii) a third UI tool for generating a list of content items based on the retrieved tags. In some embodiments, each tag in the set of tags is associated with a computed metric. The tags are sorted based on this metric in some embodiments. The metric of some embodiments is based at least partly on a user type. User types include content provider, content retriever, and content evaluator.

In some embodiments, the UI also includes a UI tool for receiving content or presenting the list of content items through a communications network. In various embodiments, the communications network may be a network of networks (e.g., the Internet), a private network, a public network, a wireless cellular network, etc.

Some embodiments provide an application for retrieving, tagging, analyzing, and delivering content. The application includes a tag receiver for receiving content from a content provider and for retrieving tags from a tag pool and a tag processor for receiving the content and tags from the tag receiver. The tag processor includes (i) a tag assignor for associating a set of tags to the content and (ii) a tag chain organizer for organizing the set of tags into a tag chain table. The application further includes a tag score calculator for computing a tag score metric for each tag from the set of tags and associating the tag score metric with a particular subset of tags from the set. In some embodiments, the tag processor is further for receiving feedback from a feedback manager. The tag chain table of some embodiments includes a list of tag chains, a user type associated with each tag chain, and an affinity score associated with each user.

BRIEF DESCRIPTION OF THE DRAWINGS

The novel features of the invention are set forth in the appended claims. However, for purpose of explanation, several embodiments of the invention are set forth in the following figures.

FIG. 18 illustrates a GUI of some embodiments for presenting news items according to parameters set by a user of the CID system.

DETAILED DESCRIPTION OF THE INVENTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention implement a method for submitting, organizing, and searching for content. Such content will be referred to below as searchable content, examples which include documents (e.g., articles, websites, news, books, etc.), video (e.g., movies, documentaries shows or any other professional or armature video clips), or music (e.g., songs, albums, etc.). In some embodiments, a Content Intelligence and Delivery (CID) system identifies, targets, monetizes, and delivers content to outlets which may be interested in disseminating the content. Accordingly, the online marketplace provided by some embodiments is facilitated by the principals of supply and demand, discovery of quality, and wisdom of crowds which are inherent in any free marketplace.

Through the CID, a community is created that allows content providers (e.g., content creators, content sellers, etc.), content retrievers (e.g., content reviewers, content buyers, etc.), content editors, content publishers, and other members to interact. The content providers provide the content that is subsequently made available to content retrievers for review, purchase, and/or dissemination to the public after the content is automatically categorized, prioritized, routed, and/or monetized based on system parameters. The content editors are permitted access to the system parameters to continually adapt the configuration, rules, and behavior of the community. In some embodiments, the CID includes: (1) a member manager, (2) tag manager, (3) content appraiser, (4) content packager, (5) routing engine, (6) content delivery network, and (7) a feedback manager.

Figure 1:
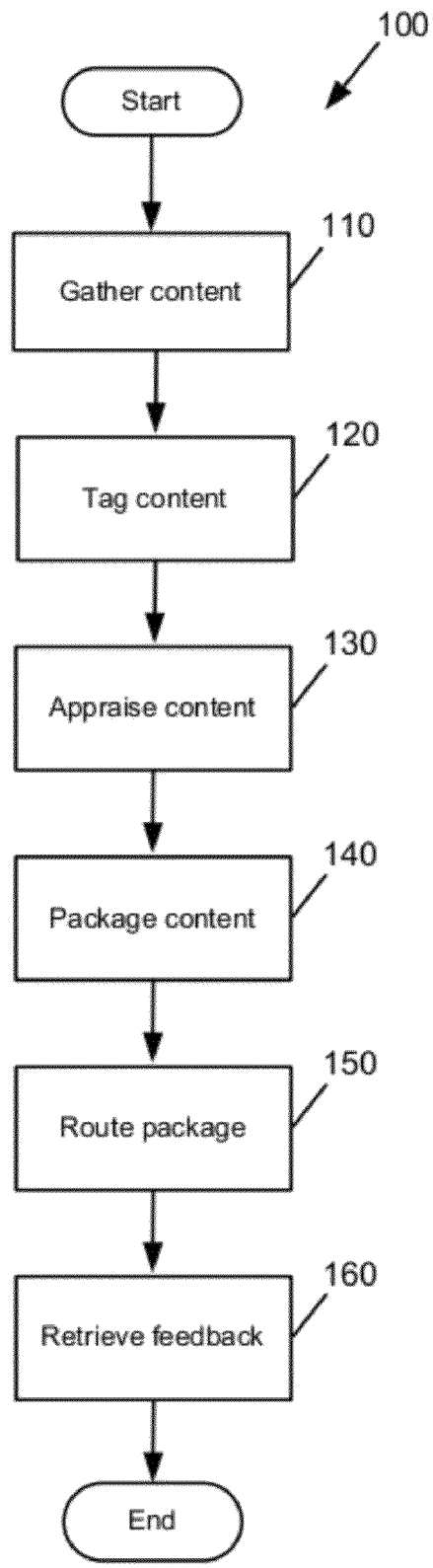
FIG. 1 presents a process performed by some embodiments of a Content Intelligence and Delivery (CID) to implement the online community for distributing content.

FIG. 1 presents a CID process 100 performed by some embodiments of the invention to implement the online community for trading content. The process 100 begins by the member manager of the CID acquiring (at 110) content (e.g., stories, images, videos, audio recordings, etc.). In some embodiments, the member manager acquires the content automatically by electronically scanning a network or network of networks (e.g., the Internet) to look for content to classify and package for sale. In other embodiments, the content is manually provided by content providers and creators or by administrators of the member manager component. Once collected, the process then tags (at 120) the content to define the content using the tag manager of the CID. The tag manager allows content to be described through tags and associated tag chains. Tag chains describe the relationship between tags and thereby describe content along with their associated tags. Some embodiments provide novel tags relationship operators (called tag calculus below) to construct tag chains from tags. Accordingly, using tags and tag chains, the content becomes structured for easy searching and association with other related content based on associated tag chains. Tag chains are also referred to tag clusters and each term can be used interchangeably.

The process appraises (at 130) the tagged content using the content appraiser based on a variety of parameters. For instance, some embodiments appraise the content based on the relevancy of the tag chain, the date associated with the content, whether the content can be auctioned, the delivery mechanism by which to sell the data, the content value type, the ownership of the content, priority queues, and pricing.

The content packager of some embodiments packages (at 140) the content for subsequent routing. In some embodiments, packaging the content includes inserting one or more of the actual content, a content notification, a content teaser, a contract, metadata describing the content, embedded advertisement, or an embedded feedback mechanism into the package to be routed.

The process then utilizes the routing engine of some embodiments to target (at 150) potential buyers for content offerings. In other words, the routing engine decides which content retrievers may be interested in a given content package. The routing engine targets the potential retrievers via a variety of parameters. For instance, the routing engine targets retrievers based on prior patterns of the content retriever, ongoing projects revealed to the CID by content retrievers (e.g., wanted advertisements for particular news stories, related topics, and story leads), organization type of the content retriever being targeted (e.g., the New York Times as opposed to the National Enquirer), and prior experiences with the content provider.

Once purchased, the content is delivered to the content retriever over the content delivery network. In some embodiments, examples of such a network includes private or public networks, network of network (e.g., the Internet or a public or private wireless cellular network). The process then utilizes the feedback manager component to learn (at 160) about the effectiveness of the CID's ability to accurately understand content, understand its content retriever community in order to target them accurately for current offerings, and the quality of the content being sold through the system. From the feedback, some embodiments are able to adapt the tagging, appraising, packaging, and routing of content such that accuracy and relevancy of content is continually improved. The feedback may arrive from several different sources. Some such sources include the content editor community, content retrievers, the clients of the content retrievers (i.e. content subscribers), and the content provider community.

Through the feedback and various other member interactions within the CID (e.g., editor-member manipulation of system parameters), the CID is able to leverage the knowledge from its member community. This allows the CID to structure, organize, and improve the relevancy and accuracy of the content and to provide intelligence to the content such that the content may be used beyond its purely informational nature. For instance, the semantic organization creates a cross referencing between content that allows the content to evolve over time by assimilating the cross referenced content, by identifying historical trends, or by identifying areas where additional detail is required, as some examples. Accordingly, the CID automatically provides a semantic organization of content where relationships between newly entered content and existing content and intelligence is added to the content. This semantic organization arises not only from technology, but from the contributions of the various member communities operating within the CID and market forces allowing the CID to adapt to the ever-changing ways in how content (e.g. news) is produced and disseminated.

Several more detailed embodiments of the invention are described in the sections below. Section I describes the various members participating within the community. Next, Section II describes the architecture of the CID's tagging component of some embodiments. Section III describes one embodiment of a CID system used to define a community for trading news-related content. Section IV describes the various monetization models operable in conjunction with some embodiments of the invention. Section V describes different implementations of the CID system. Lastly, Section VI describes a computer system with which some embodiments of the invention are implemented.

I. Member Entities

As noted above, the online community provided by the CID brings together various content retrievers, content providers, and content editors of news related content. Each such member performs a different role within the community, with different members having greater or lesser affinity scores from which they are provided greater or lesser access to the various functionalities within the community. In some embodiments, the input provided by each particular member regarding content in the system is weighted differently in accordance with their respective affinity score.

In some embodiments, content retrievers include but are not limited to traditional media companies, such as print newspapers, online news websites, and television shows as some examples. However, these members may also be provided with dual roles such that a traditional media company may be both a content retriever and a content provider. Additionally, retrievers may place requests to providers for desired content. For instance, a content retriever may publish a news article about recent severe weather events, but to supplement the article, the content retriever may request additional content from experts as to the causation of the severe weather events by placing the wanted content request into the community.

In some embodiments, the community is designed to accommodate trading in intellectual content among the largest segment of providers and reviewers. For instance, in some embodiments, the community is a commercial marketplace that is open to all content providers so that the marketplace is not restricted as to mute any voices and sources of content (e.g. news) being offered. So bloggers, professional writers, photographers, those with interesting videos, or those with simply a lead for sale are permitted to participate as a content provider within the community. In addition to submitting content, content providers may elect to also submit supporting materials in order to corroborate their content.

It should be apparent to one of ordinary skill in the art that content providers may also be electronic agents. In such instances, the system's input mechanisms will be human-facing as well as machine-facing. Such functionality may be implemented by way of online "Widgets" from content providers. The content providers may provide such widgets as sellable items. In some embodiments, the widget is a programming construct that displays information in graphical or interactive depictions on websites. Such functionality is required for content retrievers whom wish to put their own content through the system in order to gain intelligence on their own content and better monetize it.

Moreover, member entities may be classified via their respective affiliations. For instance, members may be classified based on club membership, organizational membership, political affiliation, or professional affiliations as some example. Some embodiments monitor these affiliations and leverage the affiliations to better target their offerings. In some embodiments, the affiliations will be voluntarily shared with the CID and shall be maintained in a confidential manner. This shared information can be viewed as personalization parameters defined by each member so the CID can provide tailored content and features as well as predict the needs of each particular member.

In some embodiments, content retrievers are scrutinized much more than content providers. Content retrievers are checked for their viability to attract audiences, their ability to pay when applicable, the nature of their business (e.g. providing news content), and are only offered content which is deemed to be consistent with their business. This targeting process helps to ensure that content providers' content is less compromised (only viable buyers get to see them) and prevents a flood of irrelevant content from being randomly offered to content retrievers. It should be apparent to one of ordinary skill in the art that content retrievers need not only include traditional or organized distributors but may include other entities. One such content retriever is an advertising agency. For instance, the advertising agency may become a content retriever of the system in order to search for content that matches their advertisements.

Quality control over the content being offered within the CID is performed by the content editors who usually have the greatest affinity scores within the system. Content editors may include professional journalists, news editors, media professionals, and vetted members that can become content editors. Content editors have access to system parameters which are utilized by the system in order to determine how content is categorized, prioritized, routed and monetized. By having such a wide variety of different content editors, some embodiments are able to avoid the "Silo Effect" whereby like-minded members dominate the content in terms of contributions and commentary preventing the content from appealing to much wider audiences whom will be accustomed to receiving their information through a personalized lens. Instead, some embodiments route multiple views on the same stories to different publishers.

II. Tagging Architecture of a CID System

The CID system of some embodiments is a tag centric content delivery system that treats tags and tag chains constructed from tags as content within the system. Such a CID system is highly configurable through its tagging technology. The information flowing through this system is chiefly managed by a governing user community. This governing user community functions as an editorial board that ensure that content moves efficiently through the system by monitoring and adjusting tags and algorithmic rules that intelligently service the tags. In some embodiments, the editorial board includes professional editors (e.g., professional newspaper editors, magazine editors, online editors, television editors, etc.)

The tag technology of the CID system is a powerful tool when tag integrity is preserved. A system flooded with useless tags, duplications, and overloaded meanings impair the tag integrity of a system, therefore it is crucial that tag integrity is overseen by a governing board. Tags in the CID system are the vehicles for content providers to describe their content, for content retrievers to describe what they are searching for, and for advertisers to describe content which may be best suited for their ads. Tags can also be used by editor-members to elevate content or individual content providers and their content, and for content retrievers to contribute their feedback regarding the content, including end-user comments. In essence, tags and their related constructs are building blocks that make up the language which is used in order to communicate the meaning of content being transacted, the monetary value of the content, the sentiments and views associated with the content, and how the content is consumed.

Tag integrity is partly achieved through a tiered member community model. One key highlight of this model is that community members lacking sufficient track-records (i.e. affinity) are required to select from a list of existing tags, or find sponsorship from higher ranking members of the community. This will be further elaborated in the subsequent sections. To fully understand the tagging technology of the CID system, tags will first be elaborated on and the architecture behind the tagging component of the CID system will then be described.

A. Tag Nomenclature

In some embodiments, multiple types of tags are created and reside in the CID system. Each separate tag in some embodiments is a part of a hierarchical system in which tags are associated with different levels to differentiate how broad or narrow the tag defines a category of content. For instance, a "super tag" is a tag that is defined by the system and encompasses very broad categories. By way of example, Super Tags for news content can include, 'Politics', 'Sports', 'Economics', 'Business', etc. The next level of tags, namely first level tags, are originally seeded by the system and can be further defined by expert members (i.e. members with high affinity). These first level tags define general categories right below the Super Tags and are more permanent and less content driven. For example, first level tags that might reside under a 'Politics' Super Tag can include, 'Trade' and 'US President'. Second level tags are chiefly content driven.

In some embodiments, these second level tags are entirely defined by expert users and/or are sponsored by expert users on behalf of non-expert users that do not have a high enough affinity within the CID to activate new tags. Some embodiments also allow expert users to create additional levels of tags to help describe content with further precision. In some embodiments, non-expert users also have the option of purchasing second level or lower level tags which can become permanent tags in the system if they are valuable and create enough activity to justify making the tag permanent and available for other users.

The above described tags are combinable to form composite objects called tag chains. These tag chains help further define content. Specifically, tag chains are groupings of tags that are maintained in the form of a list. In the context of news content, tag chains narrate the story they are associated with. For example, a new story that addresses the swine flu epidemic can be described through tag chains to help narrate the main theme of the news item. One such tag chain could be POLITICS→US PRESIDENT→OBAMA→$1.5 BILLION SWINE FLU FUND. This chain conveys that the new item is about the flu fund initiated by President Obama. Another story regarding the swine flu might address an entirely different issue that can be described through a tag chain. For example, POLITICS→TRADE→NAFTA→SWINE FLU is a chain that discusses an entirely new issue surrounding the swine flu. Specifically, this chain describes a new item that ties NAFTA to the swine flu story. In the context of news content, a member views tags as news items and tag chains represent the various descriptions of news stories. Accordingly, some embodiments allow tag chains to be created through use of tag hierarchies. In addition to or in conjunction with such tag hierarchies, some embodiments allow tag chains to be created using tag calculus. In some such embodiments, the tag chains include operators that convey different relationships between each tag in the tag chain (e.g., a first tag in the tag chain describes the content more than a second tag in the tag chain). This is accomplished using tag calculus which is described in further detail in following section.

The following section describes how various members can create and modify tags and tag chains and how these tags and tag chains are used to deliver content in a particular format or order.

B. Overview of Tagging within a CID

Figure 2:
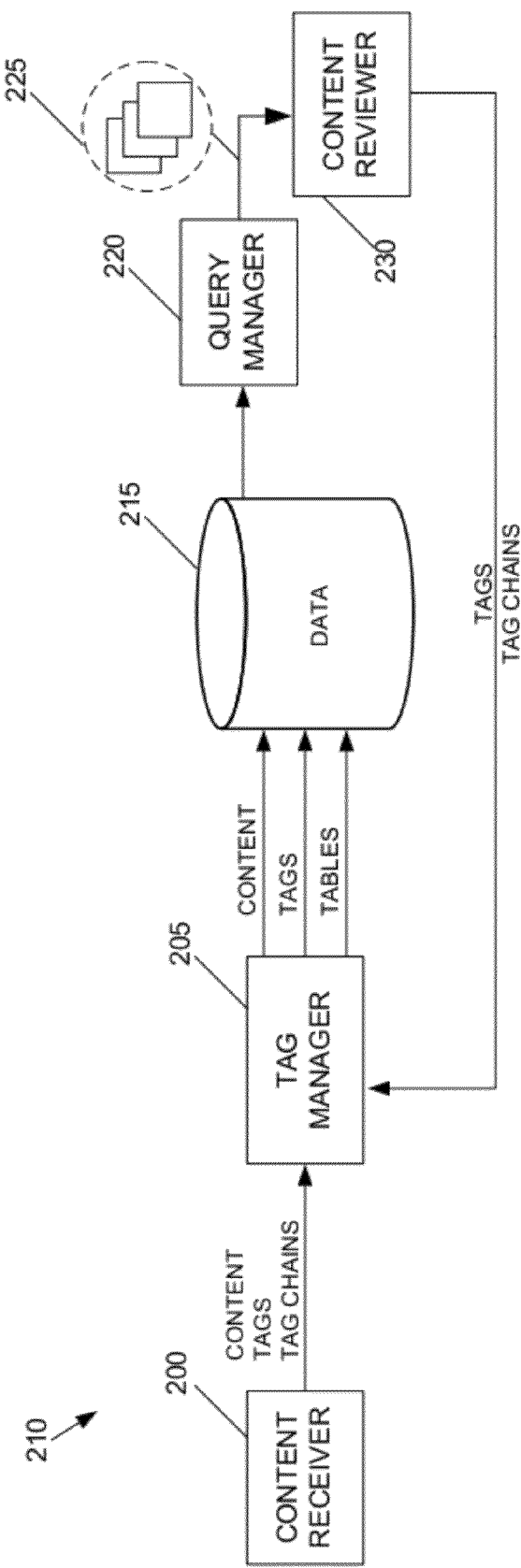
FIG. 2 presents a system architecture for tagging content used by some embodiments of a CID system.

FIG. 2 illustrates a CID system 210 of some embodiments of the invention. Specifically, this figure illustrates how tags and tag chains are used to describe content through the CID system, and to search and utilize feedback on content to optimize the system's performance to efficiently deliver content. As shown in FIG. 2, the system 210 includes a (1) content receiver 200, (2) a tag manager 205, (3) content data storage 215, (4) a query manager 220, and (5) a content reviewer 230.

The content receiver 200 is the module that receives content into the CID system. In some embodiments, the content retriever 200 can receive content through a variety of mechanisms, such as online uploads of content, offline submission of content, etc. Along with the content, the content receiver 200 receives tags and tag chains which describe the content. As described above, tag chains can be formed from tag hierarchies as well as tag chain operators. Tag calculus is the language used to construct some embodiments of tag chains using tag operators. For instance, in some embodiments, tag calculus is the use of tag operators to describe the relationships between one or more tags within a tag chain. These relationships are always in the context of the entire chain and not about individual or groups of tags. The relationships and associations of tag chains are maintained by the CID system and are constantly being optimized in an effort to find meaningful links between tag chains and the content they describe.

Many operators are available to build tag chains using tag calculus. In some embodiments, such operators can be, but are not limited to, an addition operator (+), a pound operator (#), an equal operator (=), a greater than operator (>), and less than operator (<), and a closed operator (<>). These operators can be used in a variety of combinations between one or more tags within a tag chain to define relationships between one or more tags. The relationship each above mentioned operator creates will first be described.

The addition operator (+) requires two or more tags and signifies that a chain is truly about the combination of tags. The pound operator (#) may appear between two or more tags and signifies that the tags associated with it are included in the tag chain but may not be necessarily related in any meaningful fashion within the context of the content the tag chain describes. The equal operator (=) requires two or more tags and conveys an idea encapsulated within a chain. In the context of news content, the equal operator signifies that within the tag chain that describes the news story, the ideas represented by the tags (i.e. news items) associated with the operator are in fact the same idea. In other words, they are the same ideas or topics which can be referred to by different terms and may even appear in different categories. The greater than operator (>) requires two tags and signifies that the tag on the left has greater weight within the tag chain than the one on the right. That is, the content being described by the tag chain has more to do with the tag to the left of the operator than the tag to the right of the operator. The less than operator (<) function the same way except the tag on the right has greater weight than the tag on the left. The closed operator (<>) requires only one tag and indicates that the preceding tag is not associated with the chain. This operator provides a member with the explicit method to specify that the tag chain has nothing to do with the tag associated with the operator. These operators are just a few of many possible operators that members can use to describe content in the CID.

The tag manager 205 is used to process the tags and tag chains that describe the content. Specifically, as further described below by reference to FIGS. 3-7 the tag processor 205 interprets the tags and tag chains and organizes the information into data tables for efficient searching of content based on the tags and tag chains. The content, tags, and tables and are then stored in a data storage 215.

The query manager 220 allows content reviewers to search the data in the data storage 215. To the query manager, a member's computing device 230 can specify search criteria for locating one or more pieces of content through a communication network (e.g., a public or private network or a network of networks). In response to this query, the query manager 220 returns content through the communication network that satisfies the member's specified search criteria.

The content reviewer's computing device 230 displays the content that was retrieved based on the search criteria (e.g., the computer, handheld device, etc.). The member viewing the content through the device 230 can provide comments and opinions of the content from his perspective. Specifically, as shown in FIG. 2, the tag manager 205 can receive from a member his input regarding the content in the form of tags or tag chains.

The operation of the CID system 210 begins when the CID receives content at the content receiver 200. Along with the content, the content receiver 200 receives tags and tag chains that describe the content. The content and its associated tags and tag chains is fed into the tag processor 205. The tag processor 205 interprets the tags and tag chains and converts the information into data tables that the system can understand. This information is then stored in the data storage 215 of the CID system. The query manager 220 is used to specify criteria for searching the content and pulls content 225 from the data storage 215 based on the search criteria. The content reviewer 230 displays the content retrieved by the query manager 220.

The members viewing the content can associate his own views regarding the content in the form of tags and tag chains. These tags and tag chains are then fed back into the tag manager 205 for interpretation and storage in the data storage 215. As feedback is continuously provided for a particular piece of content, the content description is refined over time through the tag processor so the CID can more efficiently filter content within the system.

C. Interpreting Tags and Tag Calculus

Figure 3:
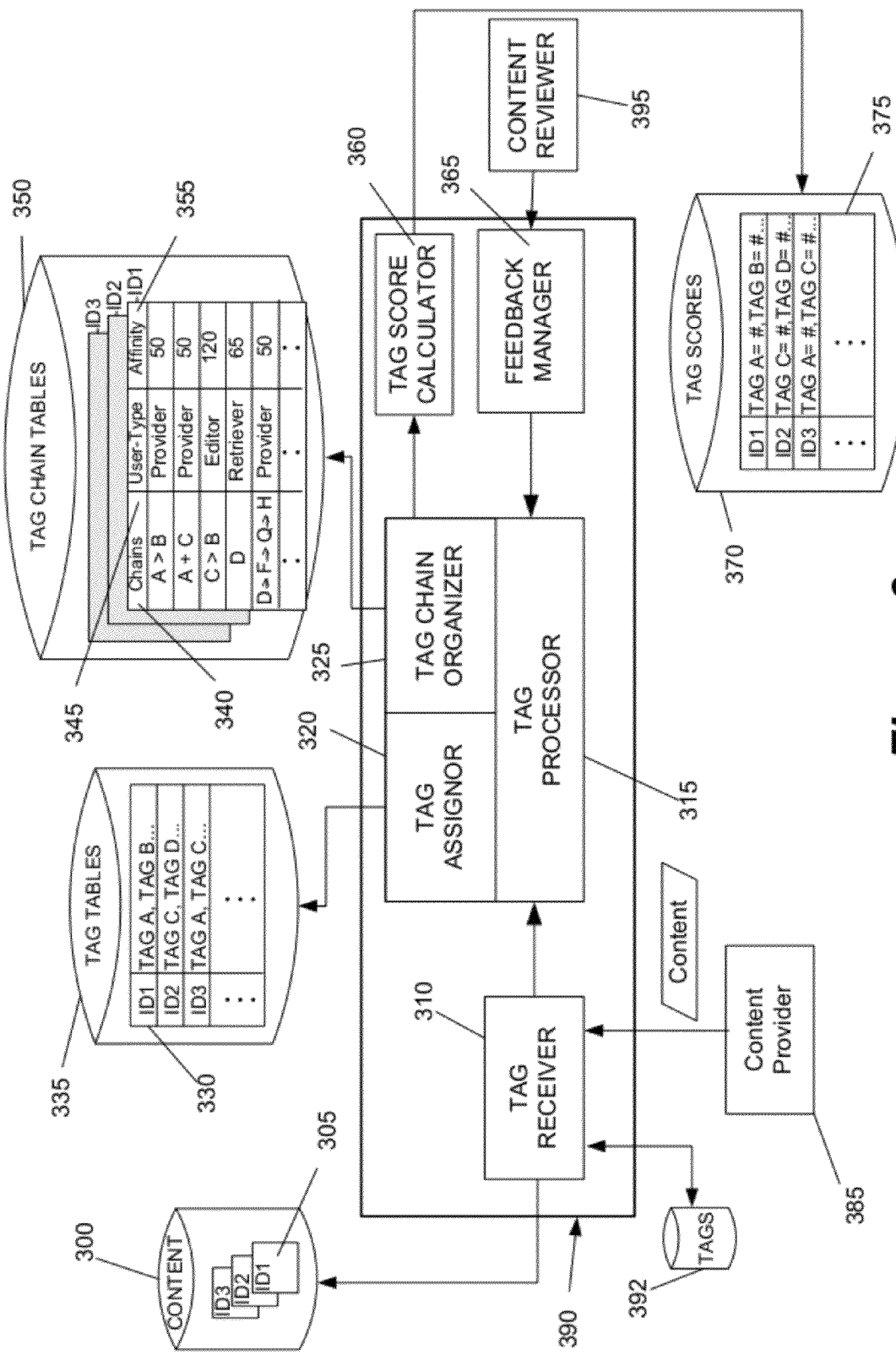
FIG. 3 illustrates a tag manager component of some embodiments of a CID system.

For some embodiments, FIG. 3 illustrates a tag manager 390 for providing and interpreting tags and tag chains within a CID system. Specifically, the tag manager 390 associates tags and tag chains to content, interprets and converts tag calculus and tag hierarchies into a usable form, and stores the tag data and chains interpretations for each piece of content in the CID system. In some embodiments, the tag manager component includes (1) a tag receiver 310, (2) a feedback manager 365, (3) a tag processor 315, (4) a tag assignor 320, (5) a tag chain organizer 325, (6) a tag score calculator 360, and (7) data storage 300, 335, 350, and 370 for storing content, tag tables, chain tables, and tag score tables.

The tag receiver 310 receives content from a content provider 385 and allows a content provider to select existing tags stored in a tag storage 392 or create new tags for later storage in the tag storage to describe the content. Each piece of content 305 has a respective content ID to identify the content within the CID. In some embodiment, the content is described through the tag receiver by associating tags to the content and linking those tags together to form tag chains through the use of tag calculus or tag hierarchies. In some embodiments, the tag receiver presents a wizard that guides a content provider through several stages that allows a user to associate tags with the content. In other embodiments, the tag receiver 310 allow users to manually select tags through pop-up windows or drop down menus of a browser or other application. The tag receiver stores each received content piece in content storage 300. It also stores each newly received tag in tag storage 392.

Like the tag receiver, the feedback manager 365 also provides tag chains to describe content. However, the tag chains from the feedback manager are provided by various members and users 395 of the content rather than the content provider.

From the tag receiver 310 and feedback manager 365, the tag processor 315 receives the tags and tag chains for processing and converting to a format the CID can intelligently use. The tag processor 315 then direct the tag assignor 320 to convert the tags provided by the tag receiver 310 and feedback manager 365 into a tag table 330 that specifies all the individual tags associated with a particular piece of content.

Similarly, the tag processor 315 direct the tag chain organizer 325 stores and organizes all the tag chains provided by various members and content users. For instance, in some embodiments the tag chain organizer 325 stores for each piece of content a table in a chain table storage 350. As shown in FIG. 3, the table for each content specifies each tag chain 340 associated with the content, the type of user or member 345 who created the tag chain, and the user's affinity score 305 that indicates the level of expertise or seniority within the CID system. Tag chains recorded in a tag chain table can include (1) single tags, (2) tag chains created with tag operators, and/or (3) tag chains specified through tag hierarchies.

The tag score calculator 360 calculates a score for each tag associated with a piece of content in the system. Some embodiments of a tag score calculator break tag chains formed by tag operators and tag hierarchies based on a set of algorithms. For example, in some embodiments the tag score calculator 360 assigns a score for each tag by accounting for the tag calculus relationships between tags and the affinity score of the member or user who created each tag chains. Greater weight can be applied to tag chains created by members with higher affinity scores because there affinity score is indicative of their level of expertise or trustworthiness when tagging content. The tag score calculator creates a table 375 containing the content ID, tags for the content, and an associated score for each tag. These tables are then stored in a storage 370. The calculations of tag scores will be described in further detail in subsequent figures.

The operation of the tag manager 390 will now be described by following a piece of content as it passes through the various modules described above. First, a piece of content 305 from the content storage 300 is uploaded and stored into content storage 300 through the tag receiver 310. For this content, the receiver 310 also receives associated tags that describe what the content is and the information it conveys. The tag receiver 310 also allows a content provider to use tag hierarchy or tag calculus to link tags together to create tag chains that further define the content. After tags and tag chains have been associated, the information passes into the tag processor 315. The tag processor 315 processes the information and uses a tag assignor 320 to create a table 330 that lists each tag associated with the content. A tag chain organizer takes the tag chains and sorts each chain into a table containing the chain 340, the user or member type 345 who created the calculus chain and the member's respective affinity score 355. When a piece of content is first introduced into the system, only the content provider will have added tag chains to the content. The tag score calculator 360 takes these tables, interprets the data in them (e.g., interprets the tag chains in each table) and assign a score for each tag associated with the particular piece of content. The tag score calculator 360 creates a table 375 of tags and their respective score and stores them in storage 370. Once the content has been viewed by other members and users 395, they can provide their own view of the content through the feedback module 365. Their opinions of the content are provided through tags and tag chains which are fed back into the tag processor 315 which updates the content's (1) tags through the tag assignor 320, (2) tag chain tables through the tag chain organizer 325, and (3) tag scores through the score calculator 360.

Figure 4:
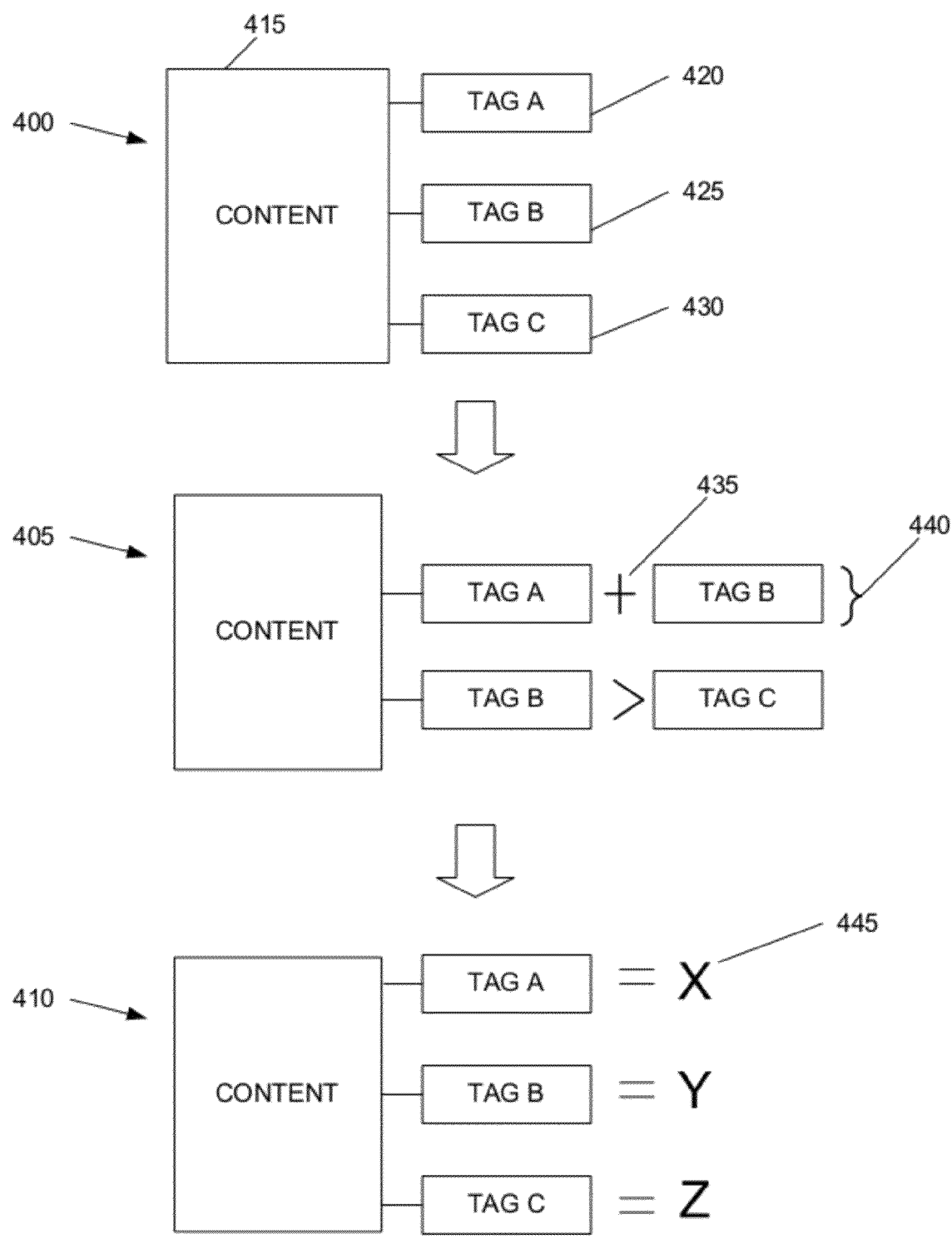
FIG. 4 illustrates the calculation of tag scores in some embodiments of a CID system.

Illustrations of how a tag calculator might score tags will now be described by reference to FIGS. 4-6. FIG. 4 illustrates a piece of content 415 at three different stages 400, 405, and 410. At the first stage 400, the content 415 is described by the content provider using three individual tags 420, 425, and 430. In the second stage 405, the tags are linked together by the content provider using tag calculus operators 435 to form tag chains 440. These tag chains further refine the description of the content by establishing relationships between the tags using tag calculus. In the final stage 410, the tag calculus has been interpreted to by a tag score calculator and an associated value 445 is assigned to each tag. These values 445 convey the extent to which each tag describes the content. For example, the three tags 420, 425, and 430 may all describe the content 415 to a certain extent. However, Tag A 420 may describe what the content conveys throughout while Tag C 430 might only describe a small aspect of the content. Therefore, this scoring system allows for the CID to deliver more precise content when content retrievers are searching for specific content in the system.

Figure 5:
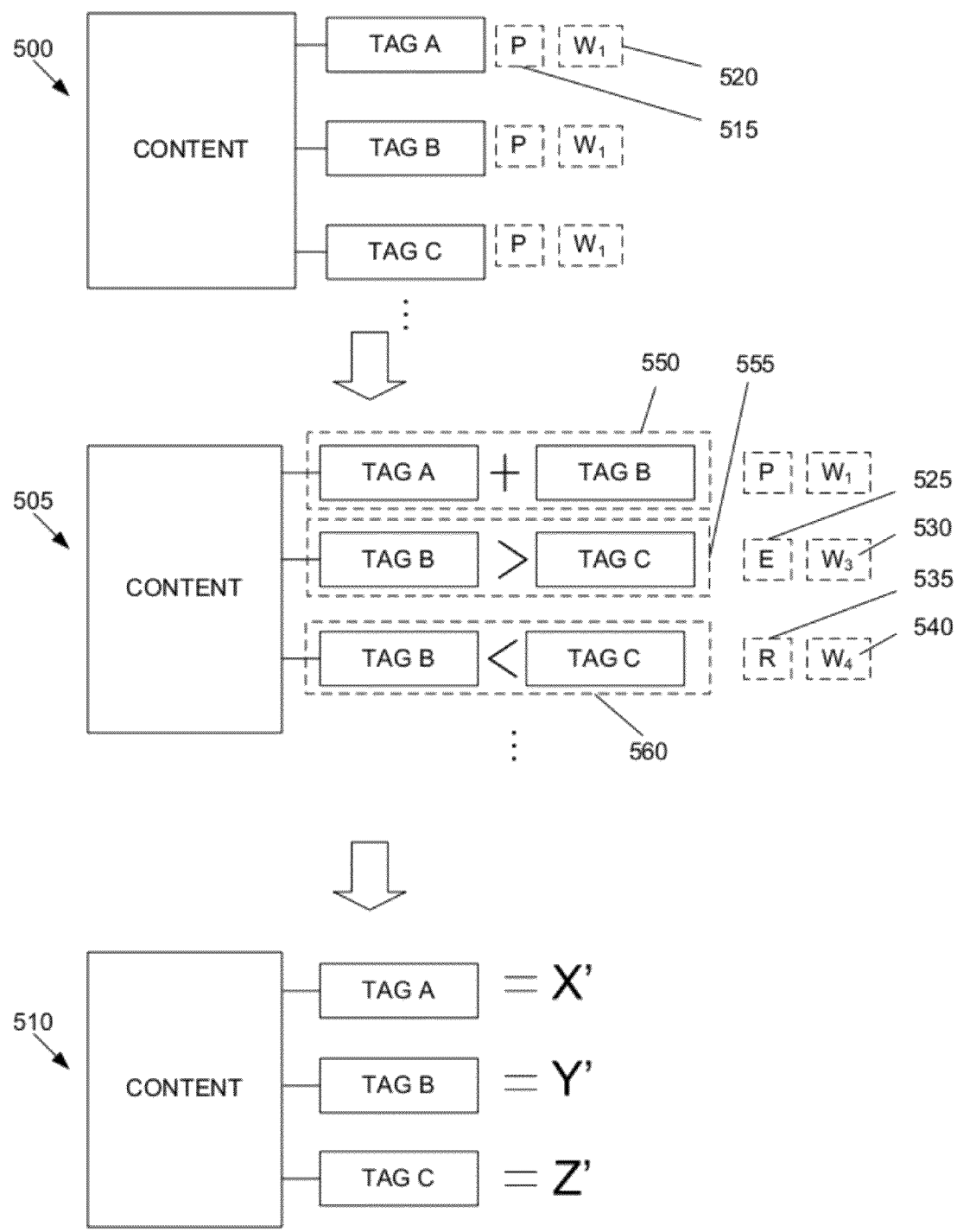
FIG. 5 illustrates the calculation of tag scores in some embodiments of a CID system.

FIG. 5 illustrates the same piece of content where different members have provided feedback by associating tags and tag chains they believe describe the content. Throughout FIG. 5, each tag is associated with a member type 515 that created the tag or tag chain and the member's specific affinity weight 520 within the system. This figure also illustrates how different members could specify conflicting views to the same piece of content. As shown, the content is described at three stages 500, 505, and 510. In the first stage 500, the content has been described with three tags and each tag has been provided by the content provider 515 having a specific affinity weight 520.

The second stage 505 illustrates that the content provider 515 has expressed a tag chain 550 that specified with a plus (+) operator that the content relates to tag A and tag B. The second stage 505 also illustrates that a content editor 525 having an affinity weight 530 has provided feedback to describe the content with a tag calculus operator using a greater than (>) operator. This tag chain 555 specifies the content is directed towards 'Tag B' and should be weighted more than 'Tag C'. A conflicting view has also been provided by a content retriever 535 having an affinity weight 540. This conflicting view is illustrated by a tag calculus chain 560 using a less than operator (<) that conveys that 'Tag C' should be given more weight than 'Tag B'. Additional tags and tag chains can continue to be added to the content as other members and users contribute feedback.

The third stage 510 illustrates each individual tag which was used to describe the content by one or more members, to have that a tag score. This score takes into account the affinity weight of each member who provided tags and tag chains to describe the content. Specifically, the tag chain provided by the editor member 525 who may have a higher affinity 530 than the content retriever 535 is given more deference than the conflicting tag chain provided by the content retriever 535.

Figure 6:
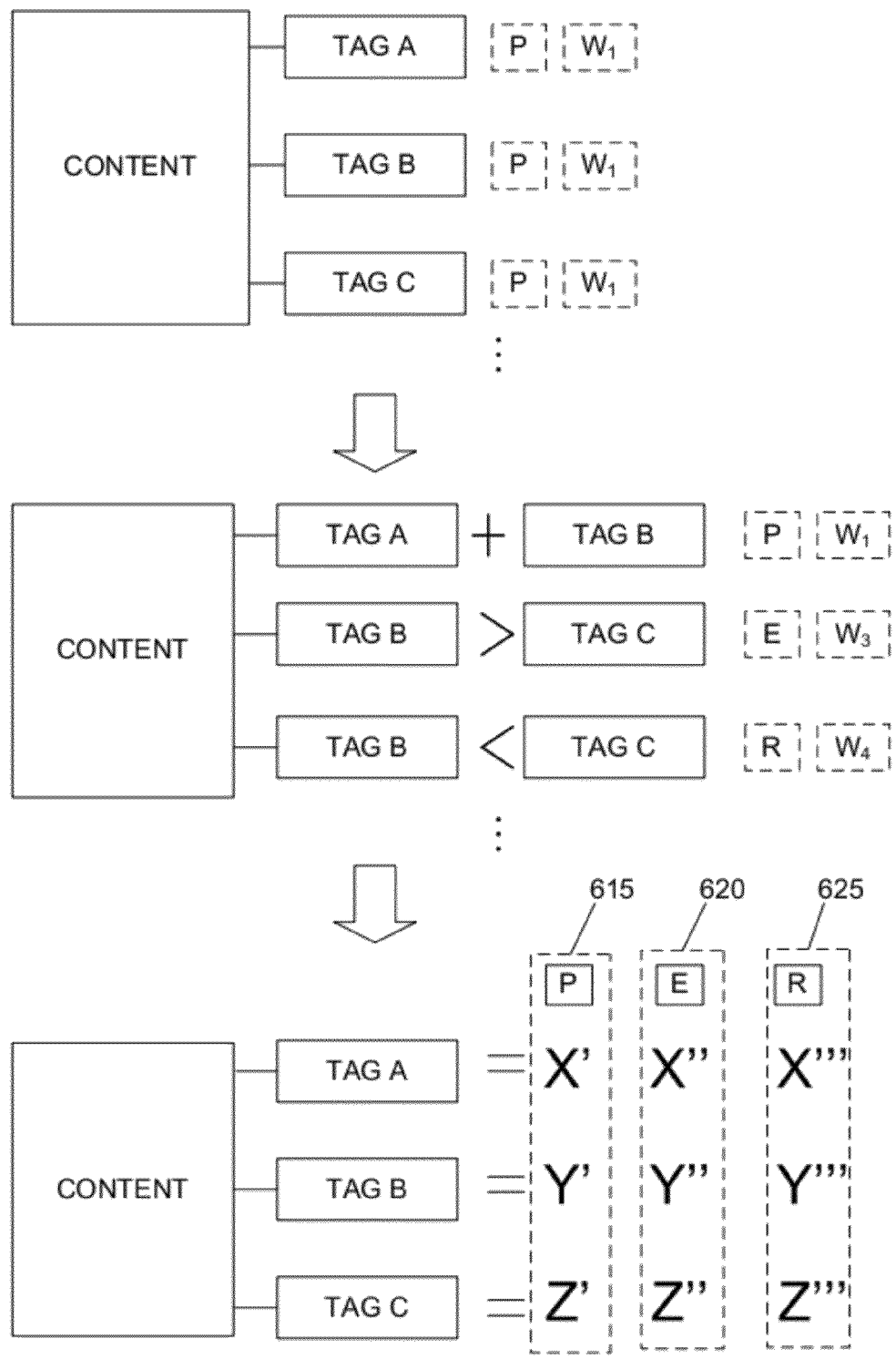
FIG. 6 illustrates the calculation of tag scores in some embodiments of a CID system.

FIG. 6 takes one additional optimization to the tag score computation methodology of FIG. 5. FIG. 6 illustrates the same tags possessing users' different tag scores to differentiate the feedback of the various member types as a whole. In some embodiments, the tag score calculator 360 can be for processing queries from (1) content providers, (2) content editors, and/or (3) content retrievers. Specifically, for processing queries from a content provider or a group of content providers, the tag score calculator 360 has computed a first set of tag scores 615 based on the tags and tag chains of the content. The tag score calculator also computes (1) a second set of scores 620 for the tags associated with the content, and (2) a third set of scores 625 for the content's associated tags. In some embodiments, the tag score calculator 360 computes the different scores for the different types of members by using different weighting metrics to optimize the tag score calculations for the different member types. These member types can further be differentiated according to personalization parameters provided by each member and the associations or groups such members may belong to. This tag score differentiation conveys the sentiment of particular member types and how each type of group interprets the content differently. This information is valuable and can be used by members when strategically searching for content and by the CID to intelligently provide targeted content to particular members.

D. Intelligent Searching and Delivery of Content

Figure 7:
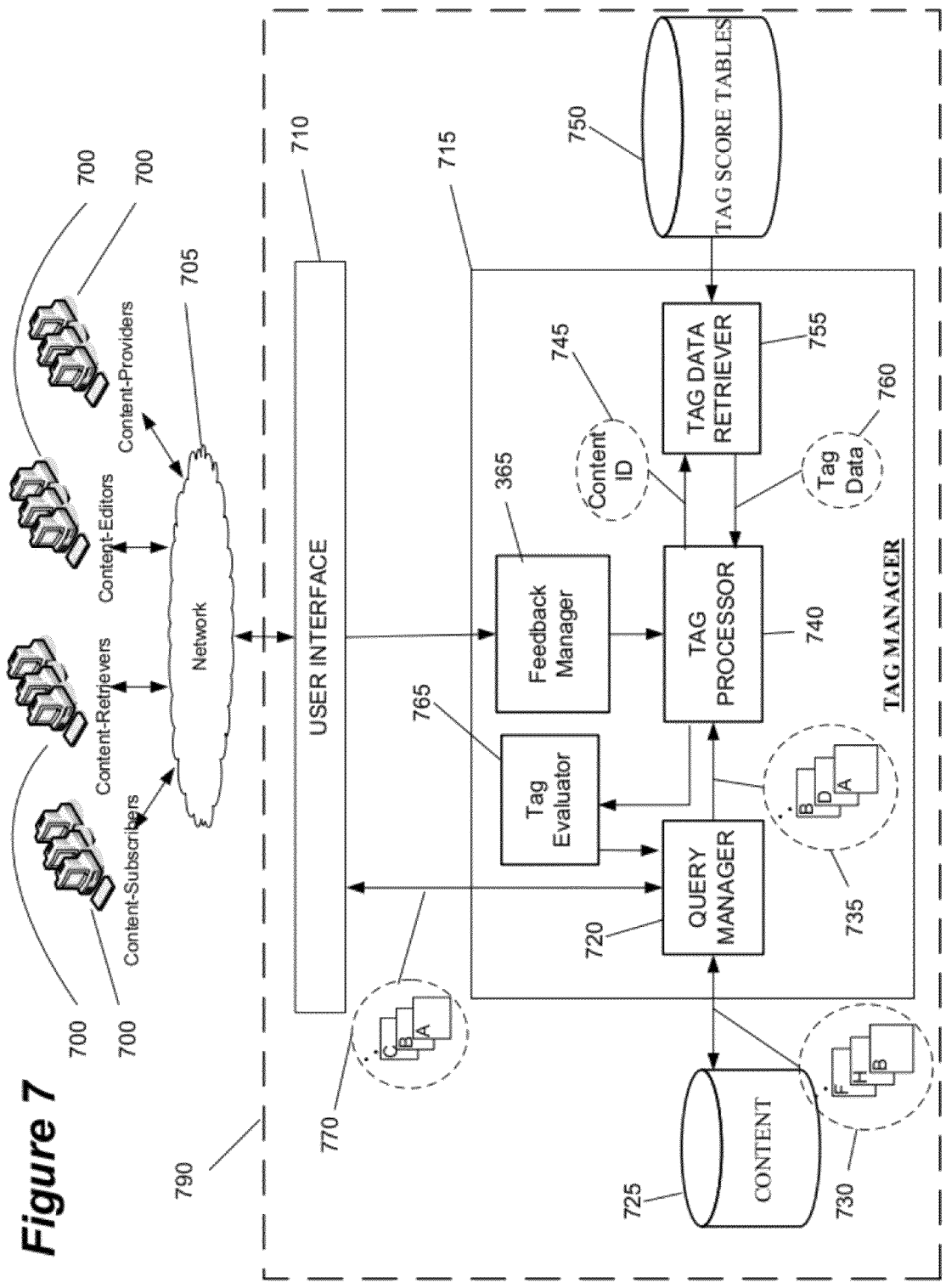
FIG. 7 presents a one embodiment of a CID system for searching and retrieving content.

FIG. 7 illustrates a CID system 790 of some embodiments that provides members the ability to search for and retrieve a sorted list of content that intelligently matches their search criteria. As shown, the CID system 790 is accessed by a variety of members 700 (e.g. content providers, retrievers, editors, subscribers) through a public or private network 705 (e.g., the Internet) that facilitates communication with the CID 790. The CID 790 includes (1) a user interface 710, (2) a tag manager 715, (3) content storage 725, and (4) storage 750 for tag score tables.

To handle queries, the tag manager 715 of some embodiments includes a (1) query manager 720, (2) tag processor 740, (3) tag data retriever 755 (4) a tag evaluator 765, and (5) a feedback manager 365. The query manager 720 receives search criteria provided by a member 700 through the user interface 710 of the CID. Based on the received search criteria, the query manager 720 searches the content storage 725 and retrieves content that it sends to the tag processor 740. The tag processor 740 receives content 735 and processes the tag data 760 associated with each piece of content 735. Specifically, the tag processor 740 uses each retrieved content ID 745 to direct the tag data retriever 755 to pull tag data 760 from storage 750 and provide the data 760 to the tag processor 740. The tag evaluator 765 interprets the tags and scores associated with each piece of content and provides a sorted list of content 770 to the query manager, which provides the sorted results to the content searcher through the user interface 710 and the network. The tag calculator 765 performs the sorting in some embodiments by (1) using the search query terms to identify tag data that is most relevant to the search and (2) using the identified tag data to determine the most important tag data retrieved from the tag score table and thereby determine the most important retrieved content (i.e. to sort first the content related most closely to the search criteria)

The operation of the tag manager 715 begins when a member 700 accesses the CID 790 through the network 705. A member searching for specific content provides search criteria through the user interface 710 to the query manager 720. The search criteria can specify many searchable parameters. For example, the search criteria can include the type of content, the subject of the content, identify specific content providers or groups of providers, and even content that includes specific tag calculus chains.

The query manager 720 pulls unsorted lists of content 730 from content storage 725. Based on the search criteria, the query manager 720 provides all possible matching content 735 to the tag processor 740 along with the search criteria. Furthermore, the query manager can also account for the personalization parameters of a member and retrieve content that may indirectly relate to the search criteria the member may also be interested in. All content that matches any of the search criteria is provided to the tag processor 740 by the query manager 720. The content now needs to be sorted so the member is provided with the most relevant content in accordance with the search criteria.

The tag processor 740 receives the unsorted list of content 735 and retrieves and organizes the tags associated with the content 735. Specifically, the tag processor 740 sends content identifications 745 for each piece of content in the unsorted list 735 to the tag data retriever 755. The tag data retriever 755 pulls tag data 760 from the tag score storage 750 and provides the data 760 to the tag processor 760. After the content 735 and respective tag data 760 is collected by the tag processor 740, the tag evaluator 765 sorts the list of content.

The tag evaluator interprets the tag data 760 and organizes the content by evaluating the tags and tag scores associated with each piece of content. Specifically, the content pieces with the tags that have the highest tag score and that most closely match the search criteria are provided to the member first. The sorted list of content 770 is then presented to the member 700 through the user interface 710 of the CID 790.

The described implementation is only one of many embodiments a CID may use to interpret tags and tag scores to deliver content to a member. One of ordinary skill in the art will recognize that the various modules described above can be implemented in a variety of combinations. Some implementations may require more comparable modules while others may require fewer modules to implement the same functionality.

E. Storing and Treatment of Tags in a CID System

For some embodiments of a CID system, all tags and tag chains reside in two physical spaces: a computer memory and a relational database on a computer readable medium and are considered to belong to a tag pool. The tag pool is the collection of all nascent tags and its structure will now be described.

Figure 8:
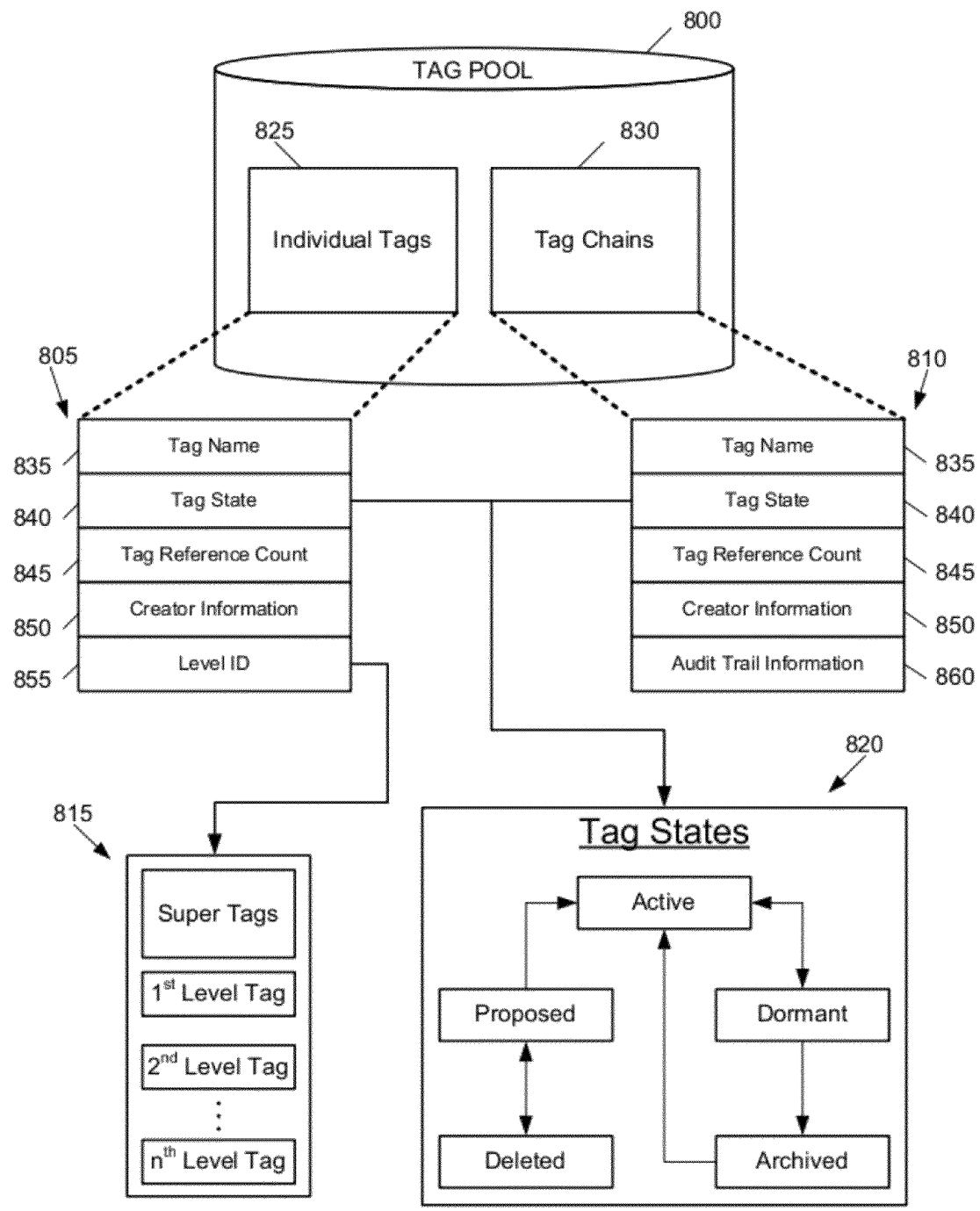
FIG. 8 illustrates a tag storage structure of one embodiment of a CID system.

A tag pool houses every tag and tag chain that is created by the system or users. The tag pool and the information tied to each tag is conceptually illustrated in FIG. 8. Specifically, FIG. 8 illustrates (1) a tag pool 800, (2) the information associated with a tag 805 or tag chain 810, (3) the different levels 815 a tag can be associated with, and (4) the different states 820 of a tag or tag chain within the tag pool 800.

The tag pool 800 is the in-memory collection of all nascent tags. This is where members grab tags from to describe their content and construct tag chains. Every constructed tag chain will also reside in the tag pool 800 to facilitate the CID in delivering and parsing content in a meaningful manner. The tags within the tag pool 800 are housed in two separate spaces; a first space 825 for individual tags and a second space 830 for housing all tag chains. Both spaces are maintained using a flat organization.

The information 805 and 810 associated with each tag defines a tag or tag chain within the tag pool. Such information includes, but is not limited to, the tag name 835, tag state 840, tag reference count 845, creator information 850, a level identification 855 for individual tags, and audit trail information 860 for tag chains. Each tag is identified as belonging to a certain level. Higher level tags are broader categories that are more permanent within the tag pool, while lower level tags are user defined and content driven. In some instances, tags can be elevated to higher levels or demoted to lower levels depending on the activity surrounding the tag. The change in level identification may be manually accomplished by an expert user and in some instances is automatically done by the CID system if it recognizes a certain increase or decrease in activity surrounding a specific tag.

Figure 9:
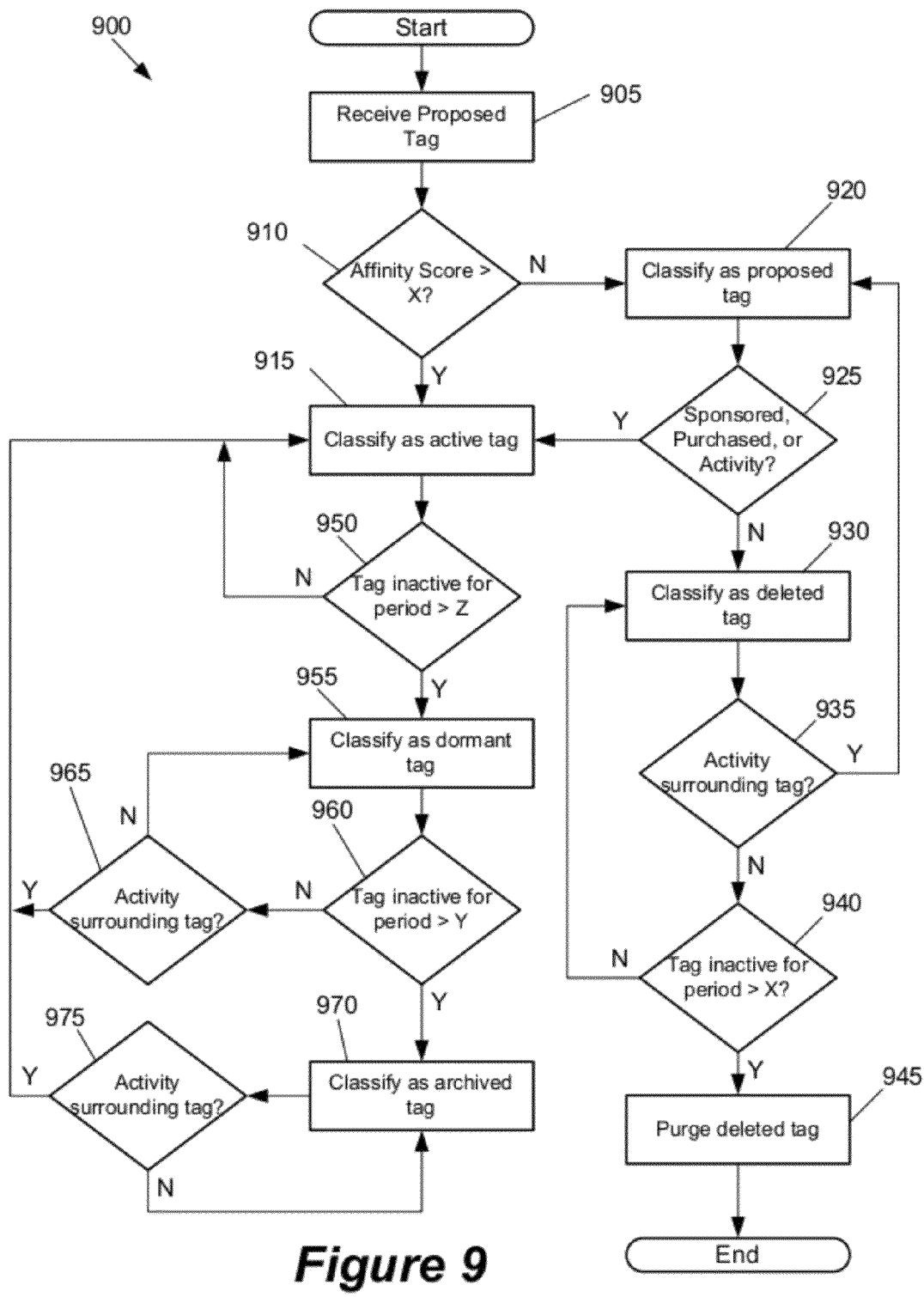
FIG. 9 illustrates a conceptual process of the different states a tag moves through during the tags lifetime in some embodiments of a CID system.

Furthermore, each tag and tag chain is in one of five primary states 820 or caches at all times within the tag pool 800. These primary states 820 are active, dormant, archived, proposed, and deleted states. As a tag or chain is created in the system, it may be classified under one of these five mentioned states. The process shown in FIG. 9 illustrates how a tag or tag chain can change from one state to another. It will become apparent that each tag and tag chain that becomes active at any point of their lifetime will exist in the tag pool indefinitely in one of the primary states. Tags that do not become active can eventually get purged from the system.

In some embodiments, the CID will implement a tag server component which will bring together a number of areas of tag-related functionality. The tag server will perform tag management, service tag queries, and provide a plug-in architecture for executing intelligent algorithms. A tag query language may be defined in order to act as the standard interface to the tag server.

FIG. 9 conceptually illustrates a process 900 of some embodiments for classifying a particular state for each tag and tag chain within the tag pool. As shown, the process begins by receiving (at 905) a proposed tag. A proposed tag is a new tag that does not yet exist in the tag pool. An existing tag or tag chain in the tag pool would already be classified under one of the five primary states and therefore would already exist somewhere along the process 900. When a new tag is proposed, the process will then determine (at 910) whether the member proposing the tag has a high enough affinity score for the tag to become active within the system.

If the member proposing the tag has a sufficiently affinity score, the process classifies the new tag (at 915) to be in an active state. In most cases editor members and vetted buyer members will possess an affinity score high enough to generate new active tags. A seasoned and trusted seller member may also activate new tags once they have obtained a certain affinity score to be seen as a trusted user. After a tag is in an active state all members can search and select the tag to describe content within the CID.

If a member lacks the sufficient affinity score needed to activate a new tag, the process then classifies (at 920) the tag to be in a proposed state. When a tag is in a proposed state, it can be elevated to an active state if an editor-member sponsors the tag, the seller-member purchases the tag and the content is eventually purchased, or if there is activity surrounding the tag within a certain time period. A sponsor could be an editor member or another member with a sufficient affinity score to sponsor the tag. If the member proposing the new tag cannot secure a sponsor, the member can alternatively purchase the tag which can become active if the content associated with the tag is later purchased. If the proposed tag is sponsored or purchased, then the process will elevate (at 915) the tag to an active state within the tag pool. An example to describe this transition in the context of news content is when a seller-member with low credentials (i.e. affinity score) has come across a breaking story he wishes to elevate. The CID system allows him to seek a sponsor or purchase the tag in order to empower the seller-member to fully describe his story. If seeking a sponsor, the CID can route the story to potentially suitable members who possesses a sufficient affinity score for sponsorship. If a suitable member elects to sponsor the story, the member would manually cause the transition from 'proposed' to 'active' for all tags and tag chains associated with that story. If the tag is purchased, buyer-members must purchase stories associated with the proposed tags and tag chains for them to transition into an active state.

Furthermore, some embodiments of the CID may automatically transition a proposed tag to an active state if there is enough activity surrounding the tag. This can occur when multiple seller-members are attempting to submit the same story within a given time window. The process can detect this pattern and will automatically elevate (at 915) the tag and tag chains associated with that story from 'proposed' to 'active'. This behavior will be parameterized using algorithmic rules and can include triggered alerts which could be sent to editor-members.

If none of the above scenarios occurs for a proposed tag, the process will classify (at 930) the tag to be in a deleted state. Specifically, tags go into a deleted state when, in a given time window, a sponsor is not found, the content associated with the proposed tags and tag chains is not picked up by buyer members, or the system does not detect enough activity surrounding the same or similar tags. The time window is configurable and is determined by the governing user community. When tags or tag chains transition from a 'proposed' to 'deleted', they remain in the tag pool for a given period of time determined by the governing user community. While tags or tag chains are in a deleted state, the system may detect content associated with the deleted tags or tag chains being reported by other members. If the CID system detects such activity, the process (at 920) will move the associated tags and tag chains back into a proposed state. If no such activity exists (at 940), the process keeps tags in a deleted state for a period of time as determined by the governing user community. After a tag or tag chain maintains its deleted state for greater than the determined period of time, the process will purge (at 945) the deleted tag from the system. The process of classifying and reclassifying tags would end for a particular tag once it is purged from the system.

Returning to the process at 915, active tag and tag chains are available for describing and searching content within the CID. The process keeps these tags active and monitors (at 950) the activity surrounding the tag. If a tag or tag chain becomes inactive for a certain period of time, the process will classify (at 955) the tag or tag chain to be in a dormant state. Dormant tags would not be prominently displayed to members like active tags due to their lack of activity, but are still available if a member wishes to specifically search and retrieve the tag through the CID system. The same tag can once again become active if the tag becomes active in the future. An example of a tag becoming dormant in the context of news content can be described through people in the news. For example, a politician may enter the news cycle as an active tag during a particular controversy. As the politician's story cools down, the tags and tag chains associated with him become dormant. A dormant tag or tag chain will stay in a dormant state until the process either determines the tag to be inactive (at 960) for a longer period of time as defined by the governing user community, or if the process does not detect any activity (at 965) surrounding the tag. Dormant tags are not disposed of since having been the in the news, the tags now have historical significance. At some point in the future, the same politician may reenter the news in which case the historical data associated with him becomes active again. In such a circumstance, the process will (at 925) elevate the state of the tags associated with the politician from 'dormant' to 'active'.

If the process finds (at 960) that the tags or tag chains are in a dormant state for an extended period of time, the process will (at 970) classify the tag into an archived state. A tag or tag chain in an archived state will not be available to a regular member for use in describing content unlike a dormant tag or tag chain. For an archived tag to come back into an active state, the CID would have to reclassify the tag (at 975) as active if activity around that tag resurfaces, similar to the politician of the above example re-entering the news. An editor-member can also manually reclassify the state of an archived tag back to an active state if the member wishes to make the archived tag available to the community once again. Some embodiments of the CID system can provide customized views of the tag states depending on personalization parameters. In other words, members with high enough affinity scores within the system may have their own tag state cache that displays the state of particular tags that a member might use based on his personalization parameters.

As described in the process 900, all state transitions which are not manually performed are time-based and driven by configurable parameters that are defined by the governing user community. In the context of news content, tag chains are essentially the intelligence about the story and are presented to buyer-members and editor-members as the description of the story, whereas individual tags represent the highlights and are the building blocks which are used in order to construct a story about a story. As described in the previous section, a tag chain is stored in the form of a list and the tags that form the chain can be linked together with operators to further define relationships between the tags. The use of operators in combination with tags is called tag calculus.

One of ordinary skill in the art will recognize that process 900 is a conceptual process, and the actual implementations may vary. For example, different embodiments may perform the various operations in a different order, may omit certain operations, add operations other than those described, etc. In addition, the process 900 may be implemented as several sub-processes or combined with other operations within a macro-process.

III. CID System for Trading News Related Content

One embodiment of a CID system can be implemented as a community for trading news-related content. This particular implementation will be described by reference to FIGS. 10-28. Specifically, FIGS. 10-14 and 16-21 illustrate a graphical user interface ("GUI") of a CID system where content providers can circulate news content and a GUI where editor members and content retrievers are intelligently provided with news content. The subsequent section will then describe one embodiment of the entire CID system architecture that may be used to define a community for trading news related content. This architecture will be described by reference to FIGS. 23-28

A. Content Providers' Dashboard

For some embodiments, FIGS. 10-14 illustrate a graphical user interface ("GUI") that is available to a content provider for submitting a new content offering into the CID system. Specifically, these figures illustrate the stages a content provider takes for 1) submitting content, 2) defining tags for the content, 3) creating tag chains using tag calculus to describe the content, 4) viewing related stories based on the selected tags and tag chains, and 5) choosing a monetization model for the content. Each stage will be described by reference to FIGS. 10-14.

Figure 10:
FIG. 10 illustrates a graphical user interface ("GUI") of some embodiments for providing a content offering (e.g. news items).

FIG. 10 illustrates a GUI 1030 at an initial screen for submitting a new content offering. Specifically, the "New Offering" tab 1000 in the GUI 1030 is shown. In this tab 1000 a content provider can define a title for his content, select the type of content being provided (e.g. text, video, audio, picture, etc.) and upload the content to the system.

As shown in FIG. 10, the GUI 1030 includes a stage display area 1035 and a user input area 1040. The stage display area 1035 is the area that displays the different stages a user must go through to submit a new offering to the system. The user input display area 1040 is an area that displays what is required by the system from the user for a new content submission.

The operation of the GUI 1030 at a first stage 1005 for submitting a content offering will now be described. As shown in FIG. 10, the first stage 1005 is where a content provider is defining the content. The content provider defines his content by providing an offering title 1020, selecting the type of offering 1015, and specifying the location of the content 1010 for uploading to the system. Here, the content provider has inputted the offering title "The Swine Flu is all about NAFTA." The offering type 1015 allows the user to define the medium of his content (e.g. text, image, video, audio). Here the content provider is specifying his content is text (e.g. article, story, novel). A content provider can then specify the location of the content file in the offering location 1010 for uploading to the system. After a content provider has inputted the required information at this stage 1005, he can proceed to the next stage by selecting the next user interface button 1025.

Figure 11:
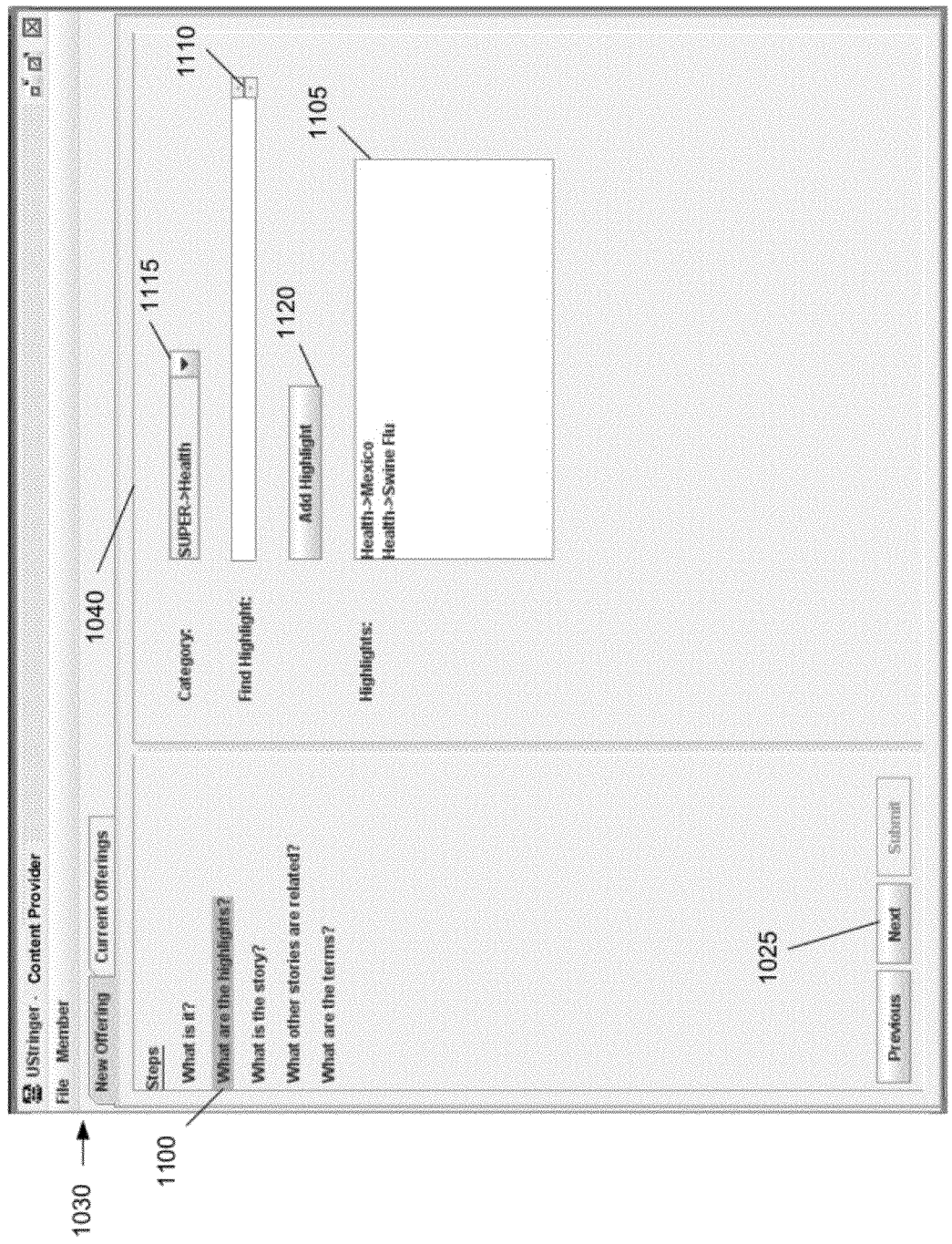
FIG. 11 illustrates a GUI of some embodiments for associating tags to describe a news item.

FIG. 11 illustrates the GUI 1030 at the second stage 1100 where a content provider will search for and associate descriptive tags, or highlights, for the content offering. In this second stage, the user of the GUI 1030 associates one or more tags to the content offering. As mentioned above, these tags, in some embodiments, are essential building blocks with which users (e.g., content provider) can describe content. In some embodiments, these tags are also building blocks with which users (e.g., buyer-members) can describe wanted-ads for content, place remarks on content, and/or other scenarios within the system where users are communicating with each other and/or with the system. To associate content with one or more tags, the input display area 1040 provides a category list 1115, a search field 1110, an association button 1020, and a highlight list 1105.

As shown in FIG. 11, a user's selection of the association button 1020 from the input display area 1040 initiates the association of a tag to the content. Specifically, to associate the tag, the user selects a category from a list of categories using the category list 1115. After selecting the category, the user then searches existing tags by using the search field 1110. The user then associates the tag with the content by selecting the button 1120. Once associated, the input display area 1040 displays the associated tag with its corresponding category in the highlight list 1105. For instance, in FIG. 11, the highlight lists 1105 displays the content as being associated with the tags "Mexico" and "Swine Flu" under the "Health" hierarchy.

In the example in FIG. 11, the search box 1110 displays tags that exist in one or more tag pools of the CID system. In some embodiment, the GUI 1030 provides user interface tools that allow the user to create new tags to add to the system. In some such embodiments, the system places restriction on which users can and cannot create tags. For instance, the system may prevent users with low affinity scores from creating new tags while allowing other users with high affinity scores. Also, in some embodiments, users (e.g., with low affinity scores) must not only use existing tags but these existing tags must have a given level of association. For instance, an existing tag must be associated with a predetermined number of content in order for it to be used by a particular user with a low affinity.

In some embodiments, when one or more users (e.g., editor-members, buyer-members) searches for a particular story, predictive tagging parameters may be dynamically tweaked or modified in a manner as to ease the creation of certain tags. For instance, when a user searches for a particular topic (e.g., 'hot story'), the system may dynamically adjust the rules so that any potential content related to that topic may get into the system for a closer examination.

Figure 12:
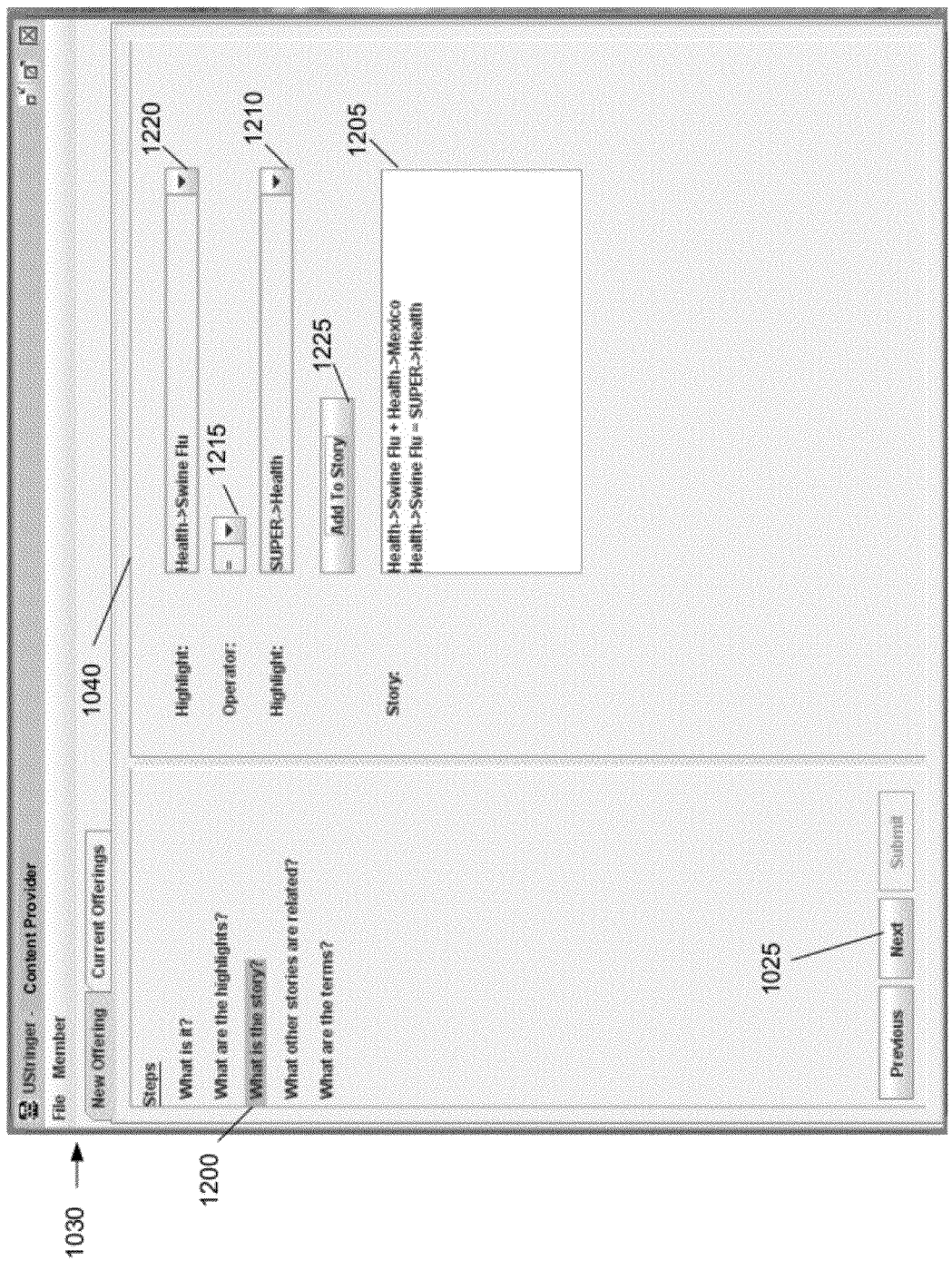
FIG. 12 illustrates a GUI of some embodiments for using tag calculus to create tag chains that describe a news item.

Once one or more tags have been associated with the content, the user then proceeds to the third stage by selecting the next button 1025. FIG. 12 illustrates the GUI 1030 at the third stage 1200 of the content submission process. In this third stage, the user describes the content by creating one or more tag chains using tag calculus. To allow such creation, the input display area 1040 provides several tag lists 1220 and 1210 for selecting tags associated with the content, an operator list 1215 for selecting an operator, tag chain button 1225 for adding a tag chain, and a tag chain list 1205 for listing tag chains.

As shown in FIG. 12, a user's selection of the tag chain button 1225 from the input display area 1040 initiates the creation of a tag chain for the content. Specifically, to create the tag chain, the user selects a first tag from the tag list 1220 and selects a second tag from the tag list 1210. The user also selects an operator from the operator list 1215. After selecting the associated tags and the operator, the user then adds the chain for submission by selecting the tag chain button 1225. Once a tag chain is added, the input display area 1040 displays the tag chain in the tag chain list 1205.

Figure 13:
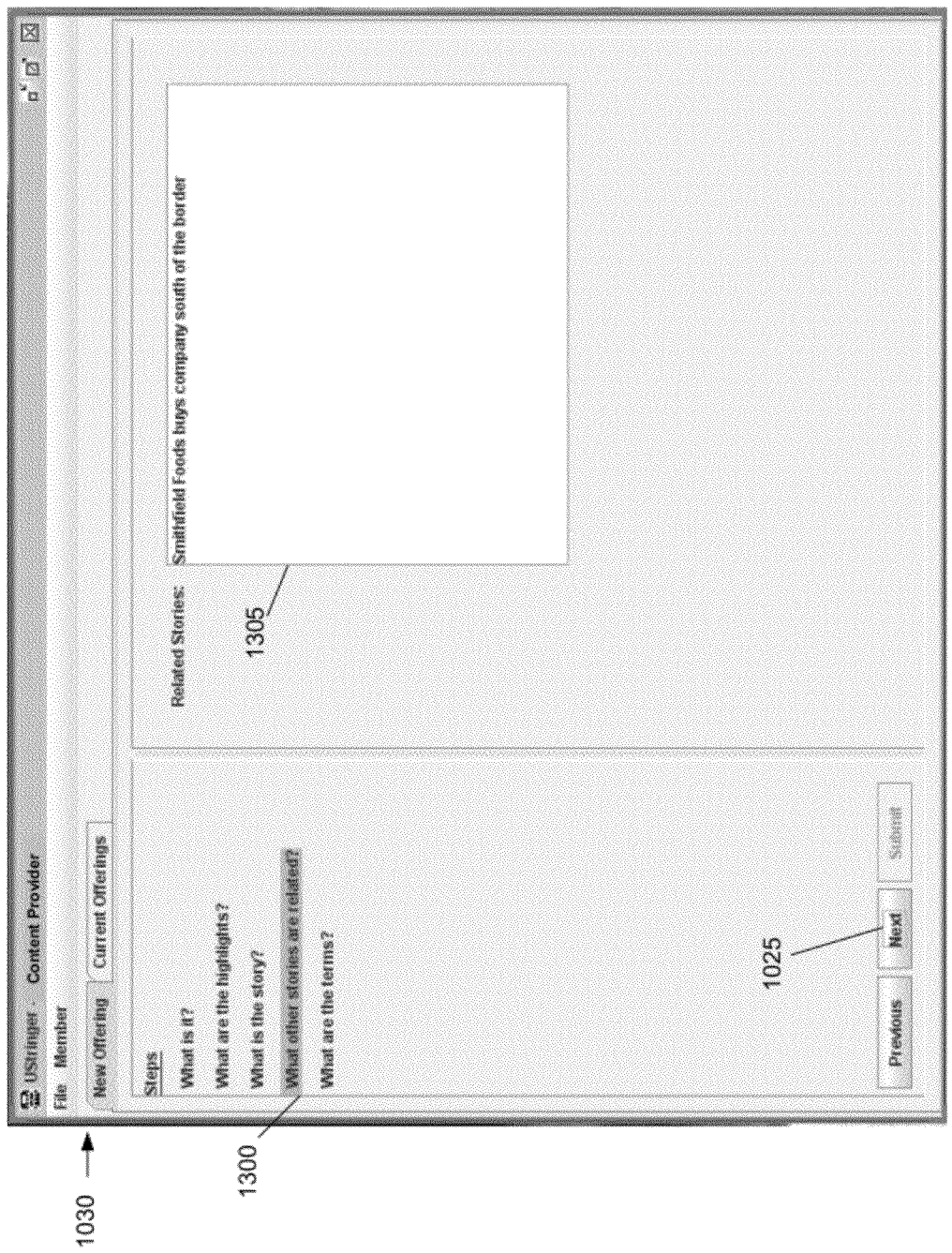
FIG. 13 illustrates a GUI of some embodiments for presenting news items similar to a new news item offering.

After completing the third stage 1200, the user then moves onto a fourth stage 1300 by selecting the next button 1025. FIG. 13 displays the GUI 1030 at the fourth stage 1300. At his stage, the input display several content that is related to the content being submitted by the user. Specifically, the system identifies other content in that may be related to the new content offering and displays the identified content in a related content list 1305. For instance, the title of a related content that the system identified is displayed in the related content list 1305. At this stage the user may choose to go back to modify the user's definitions of the tags and/or tag chains based on the content displayed in the related content list 1305.

Figure 14:
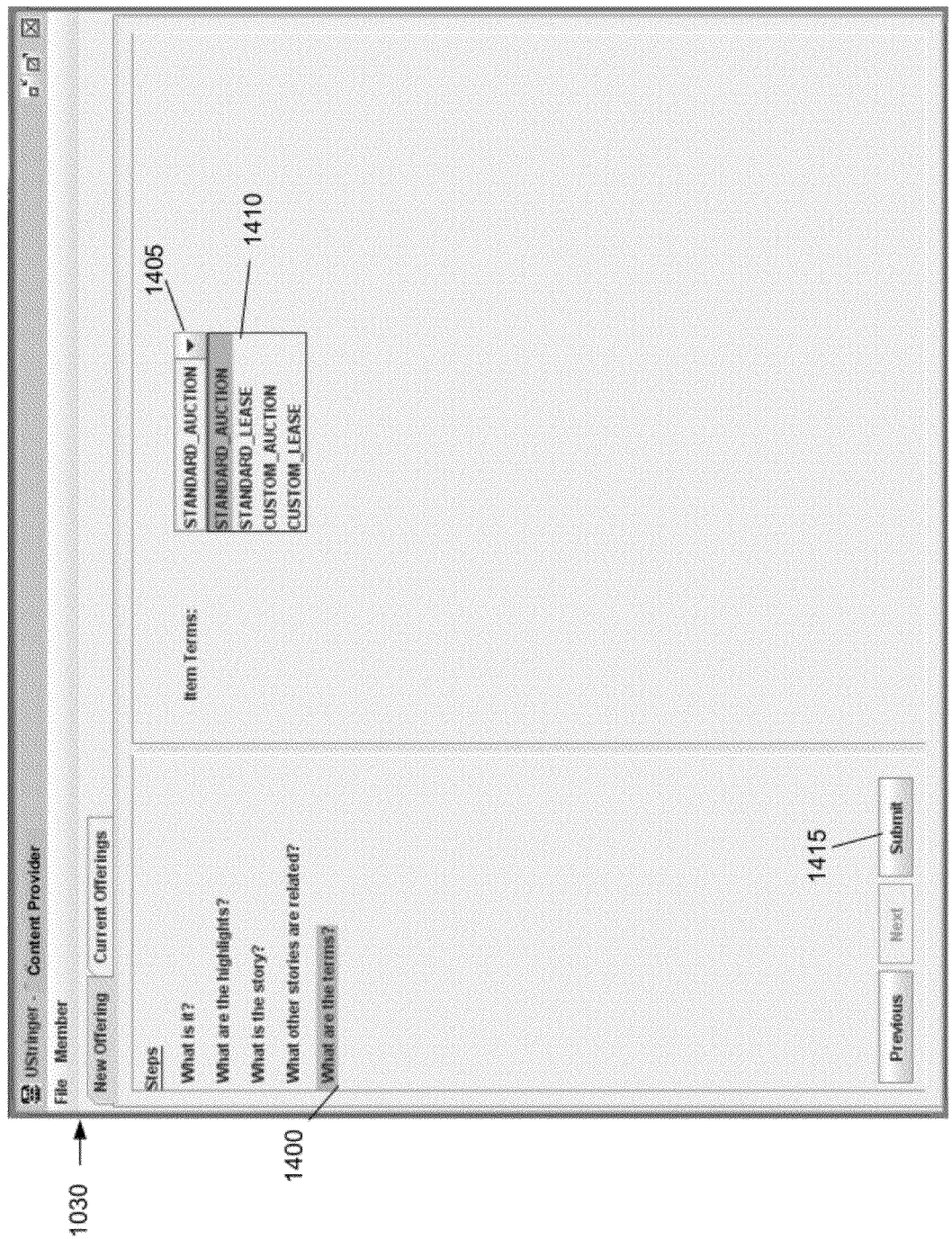
FIG. 14 illustrates a GUI of some embodiments for selecting a monetization model for a new news item offering.

FIG. 14 illustrates the GUI at a fifth stage 1400 during the content submission process. At this stage 1400, the user selects from one of several different monetization models offered by the system and/or created by the user. The system may provide a number of different monetization models. In the example illustrated in FIG. 14, a selection of an item list 1405 causes several selectable monetization models 1410 to be displayed in the input display 1040. As shown, the input display area lists "standard auction", "standard lease", "custom auction", and "customer lease" as several of the selectable monetization models 1410. In some embodiments, the GUI provides user interface tools that allow the user to define customized monetization models and/or terms. After a monetization process is selected and/or defined, the user then completes the submission process by selecting a submit button 1415.

Figure 15:
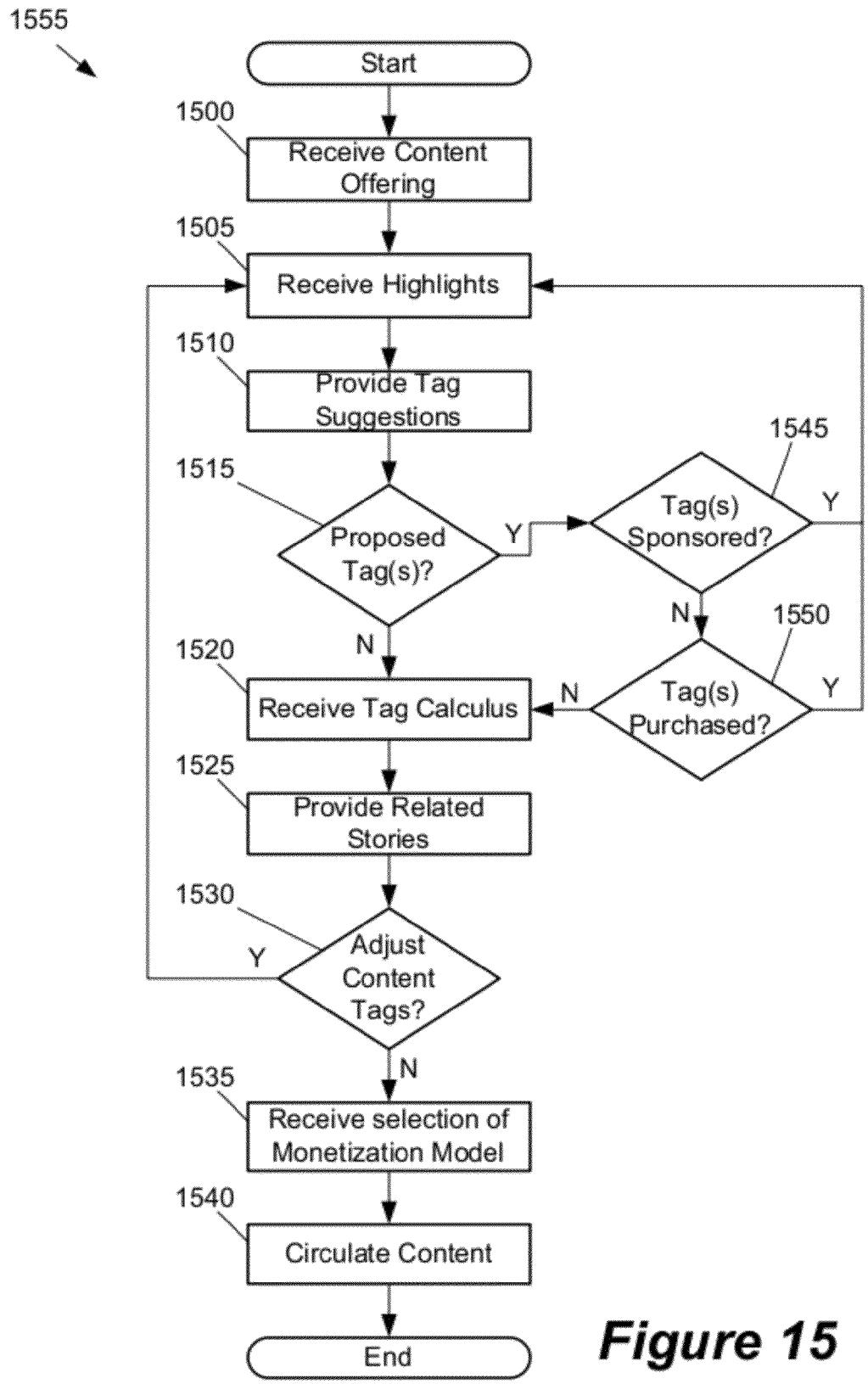
FIG. 15 illustrates a conceptual process which some embodiments perform to receive, describe, and circulate a new content offering.

FIG. 15 conceptually illustrates a process 1555 that some embodiments perform to receive, describe, and circulate a new content offering. The process is performed by a CID system in some embodiments. As shown, the process begins (at 1500) when it receives a content offering. An example of receiving a content offering is described above by reference to FIG. 10.

The process then (at 1505) receives one or more highlights in the form of tags to describe the content offering. One example of receiving such highlights is described above by reference to FIG. 11. The process then (at 1510) provides tag suggestions based on selected tags and personalization setting of the user. In some embodiments, these tag suggestion are based on existing tags stored by the CID.

Next, the process (at 1515) determines whether one or more tags submitted by the member is a proposed tag. When the determination made that a tag submitted by the member is a proposed tag, the process proceeds to 1545. Otherwise, the process proceeds to 1520. The process at 1545 determines whether the proposed tag receives sponsorship from a member with sufficient affinity to create a new tag within the system. If the proposed tag is sponsored, the process returns to 1505 where the sponsored tag can be associated with the content. Otherwise, the process proceeds to 1550. At 1550, the process determines whether the proposed tag is purchased by the user if a sponsor is not secured. If the proposed tag is purchased, the process returns to 1505 where the tag can be associated with the content. Otherwise, the process proceeds to 1520. Sponsorship and purchasing of tags was previously described in detail throughout Section II.

The process then (at 1520) receives links tags together using tag calculus to describe relationships between one or more tags. In some embodiments, such receiving entails creating tag chains using tags associated with a piece of content. Creating tag chains using tag calculus is described in detail in Section II above. One example of creating tag chain in a graphical user interface was also described above by reference to FIG. 12.

The process then (at 1525) provides related content. As mentioned above, some embodiments identify other content that may be related to the new content offering and displays the identified content in a display area. Next, the process (at 1530) determines whether the adjustment will be made to the tags. In some embodiments, this determination is made when the member decides to modify the associated tag and/or tag chain based on the identified related content provided at 1525. When the determination is made that the content tags need adjustment, the process returns to 1505. Otherwise, the process proceed to 1535.

The process then (at 1535) receives selection of a monetization model. Several examples of receiving such monetization models are described above by reference to FIG. 14. After receiving a monetization model, the process (at 1540) circulates the content offering within the CID system. The above illustrations have demonstrated how one embodiment of the CID system can receive and circulate a content offering. The next section will now describe how content offerings in the system are searched and monitored by editor members and/or content retrievers.

B. Editor Member and Content Retriever Dashboard

For some embodiments, FIGS. 16-21 illustrate a graphical user interface ("GUI") that is available to certain user members (e.g. content editors, content retrievers) for searching content offerings and monitoring tag activity. Specifically, these figures illustrate a GUI that presents news stories to editors and content purchasers that participate in the CID system. The GUI screens shown in FIGS. 16-21 illustrate 1) a hot tab for presenting hot new items, 2) a news item tab for browsing all the news items in the CID, 3) a stories tab for presenting new stories that are targeted to the member, 4) a newsworthy tab for presenting top searches made within the CID system, and 5) a research tab for searching and viewing feedback provided by a variety of content viewers (e.g., editors, purchasers, consumers, etc).

Figure 16:
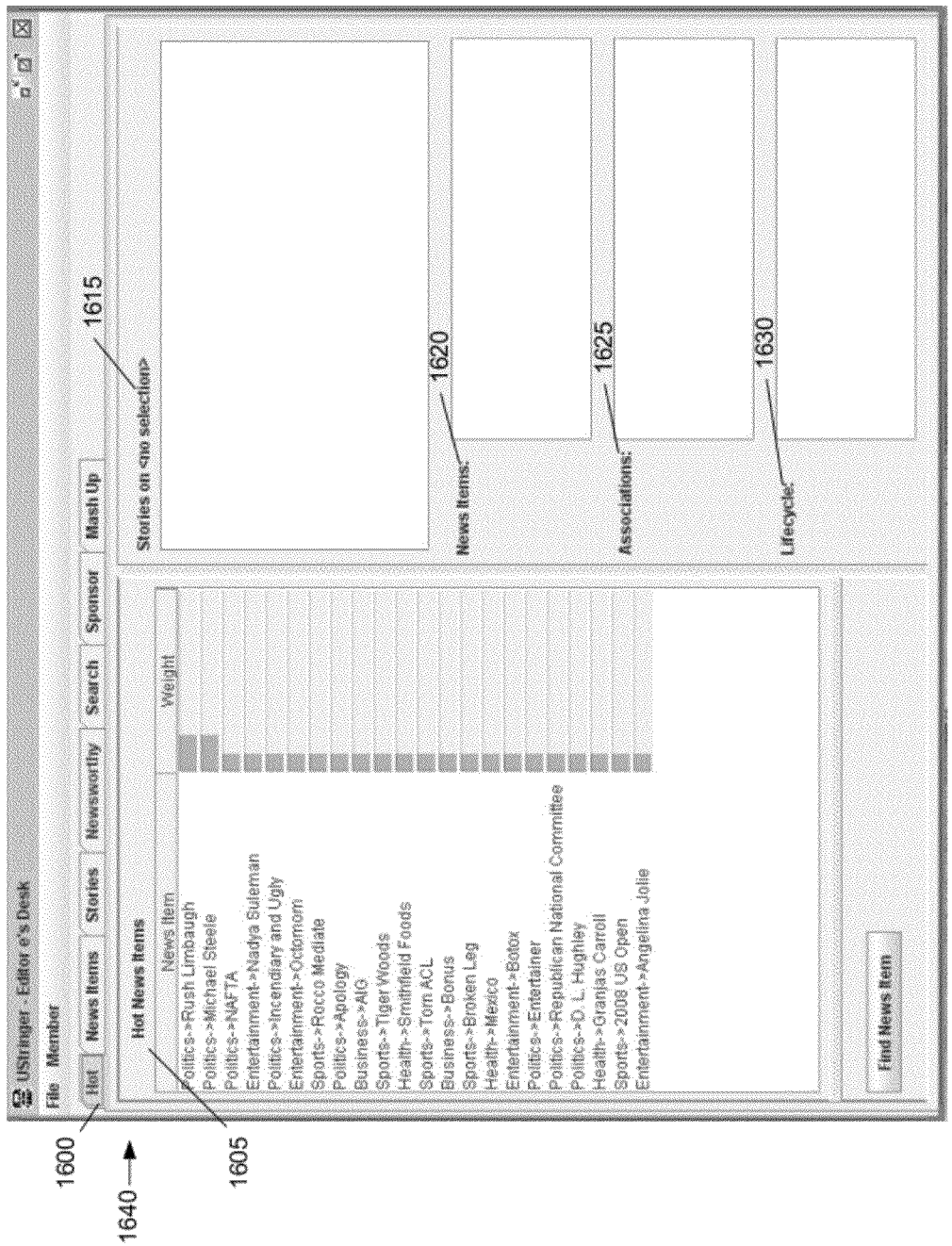
FIG. 16 illustrates a GUI of some embodiments for presenting hot news items.

For some embodiments, FIG. 16 illustrates GUI 1640 with a hot tab 1600 selected. The hot tab 1600 presents a user with all the hot news items of the day as tags in a hot news item display area 1605. As shown, the hot tab includes 1) a hot news item display area 1605, 2) a stories display area 1615, 3) a news item display area 1620, 4) an associations display area 1625, and 5) a lifecycle display area 1630.

In the hot tab 1600, the CID system filters all the news offered by various content providers and monitors activity in the tag pool to determine the most urgent stories of the day. Personalization parameters for each user are also considered when presenting hot stories. For instance, an editor member with a background in finance would receive financial news here, whereas an editor member with a political background would receive political news. Once a news item (i.e. tag) is selected, the stories associated with that particular tag are displayed in the stories display area 1615. News items that are related to a selected story in the stories display area 1615 will then be populated in the news items display area. The associations display area 1625 displays how the news items are related to the displayed stories through presenting tags that are associated with both the selected story in the stories display area 1615 and the news item displayed in the news item display area 1620. Finally, the lifecycle display area 1630 displays the lifecycle of the news item which can include dates and historical data for that particular news story. Such historical data can include other past stories that the selected news story is associated with.

Figure 17:
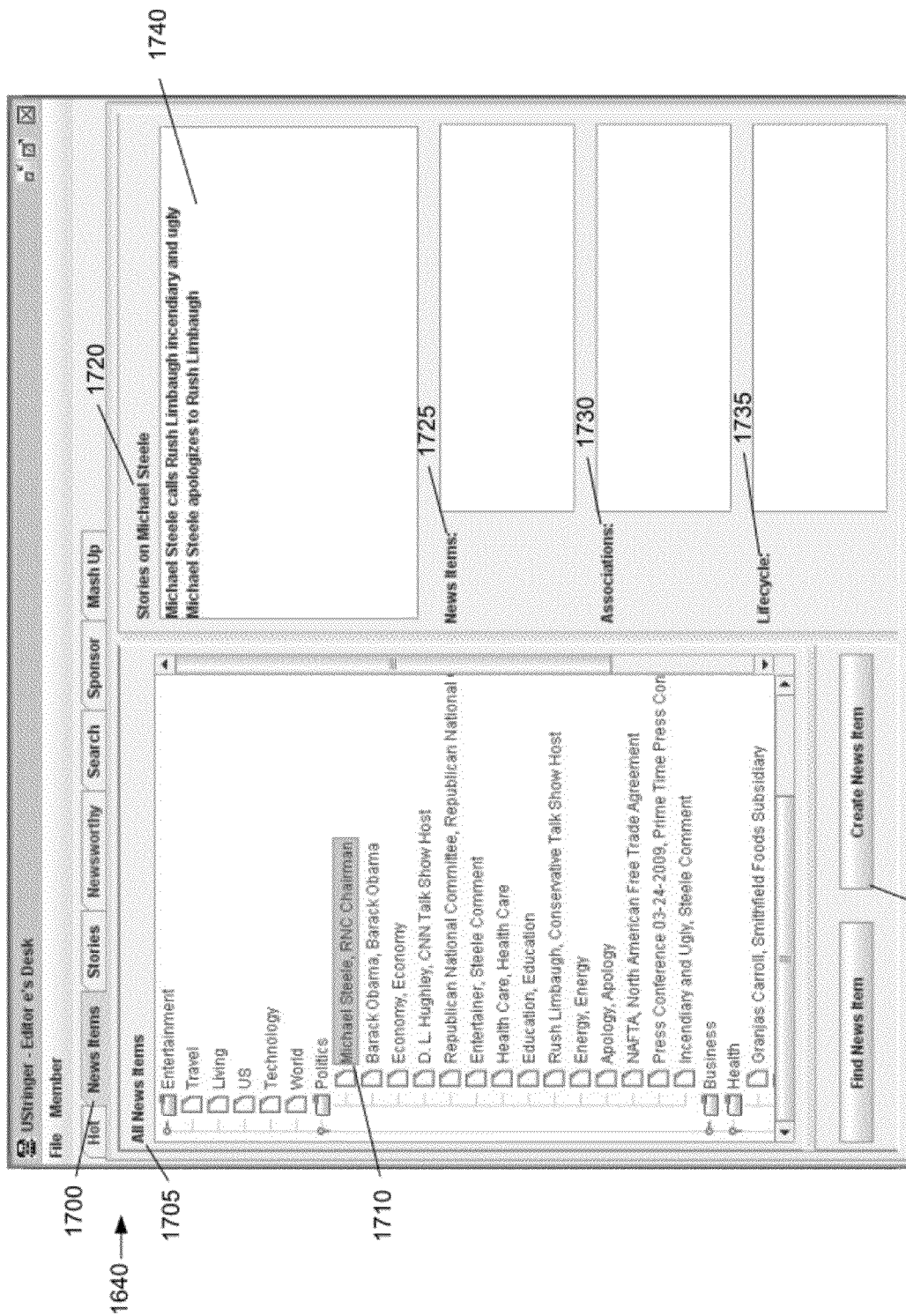
FIG. 17 illustrates a GUI of some embodiments for presenting news items within a CID system.

FIG. 17 illustrates a news item tab 1700 in the GUI for browsing all the news items in the CID system. The news item tab 1700 includes all the same display areas illustrated in FIG.

16. As shown the news item display areas 1705 is populated with all the news items in the CID system. These news items are categorized by the super tags that are broad categories each news item can be associated with. The stories 1740 related to a news items (i.e. tags) 1710 are displayed in the stories display area 1720. Selecting a news story in the stories display area 1720 populates the related news items display area 1725 with similar news items. The associations between the story and news items are displayed in the associations display area 1730 and the lifecycle display area presents the history of the particular news story that is selected. From this new items tab 1700, a user with a high enough affinity score can also create new tags (i.e. news items) using the create news item UI button 1715. This allows for creation a new tag that can be made available to content providers when describing their stories as discussed in the previous section.

Figure 18:
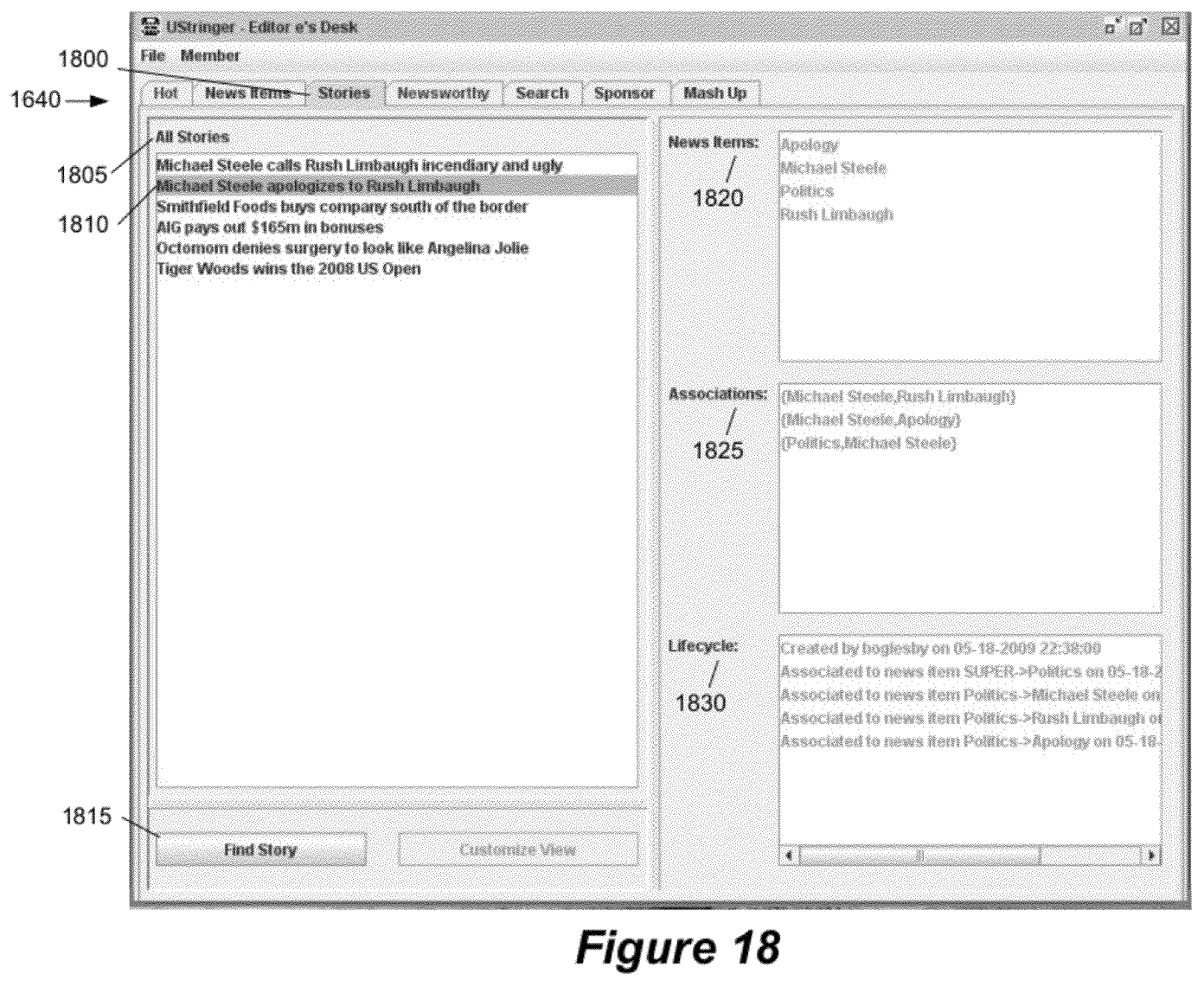

FIG. 18 illustrates the GUI 1640 with the stories tab 1800 selected for displaying the most urgent stories of the day as determined by a user's personalization settings. The same type of display areas shown in the previous figures are also shown in the stories tab 1800 as display areas 1805, 1820, 1825, and 1830. Selection of a story 1810 populates the news item display area 1820 with the story's respective news items (i.e. tags). The associations the story 1810 has are displayed in the associations display area 1825 and the lifecycle information of the story is displayed in the lifecycle display area 1830. A user can also search for a particular story by selecting the find story user interface item 1815.

Figure 19:
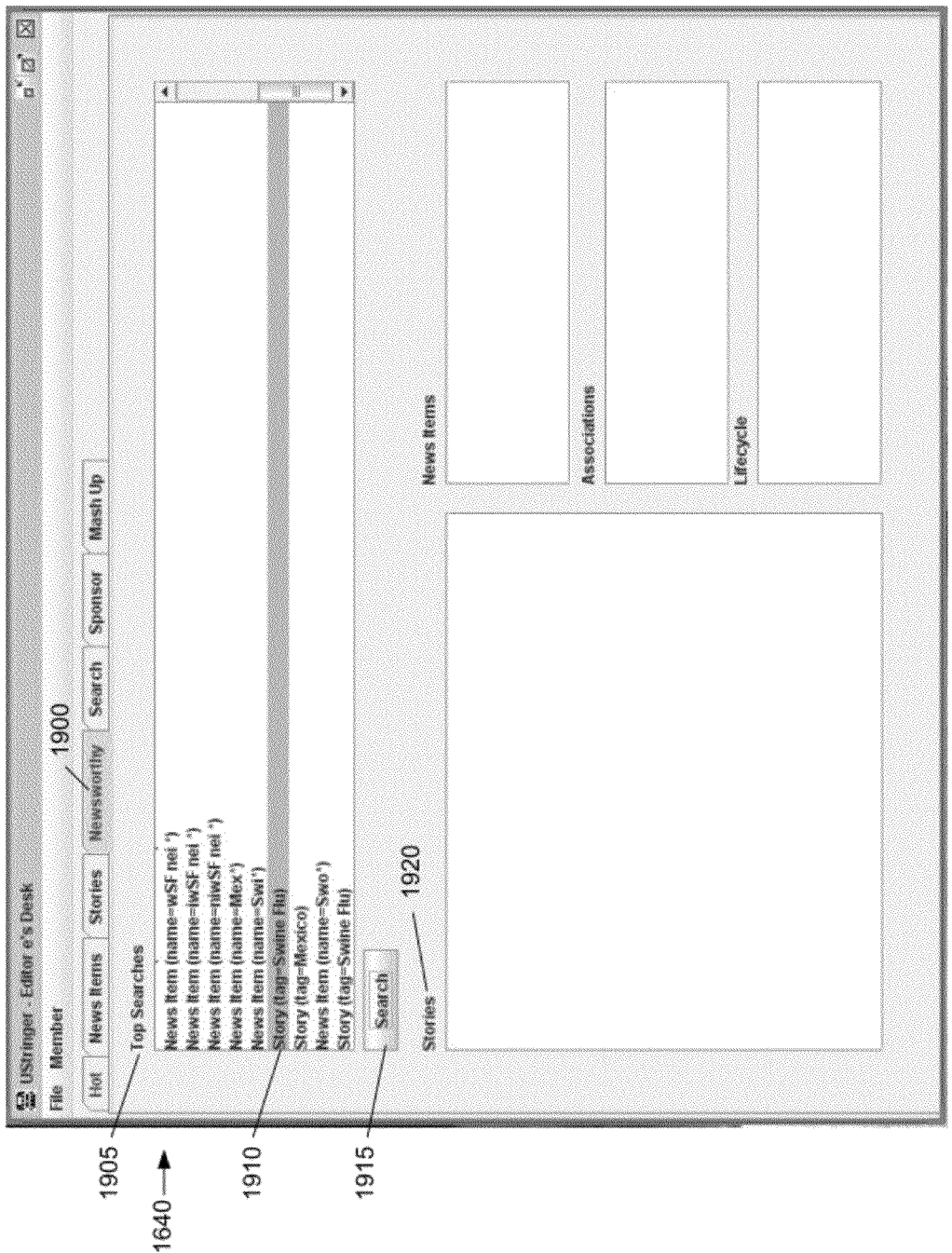
FIG. 19 illustrates a GUI of some embodiments for presenting top searches made in the CID system.

FIG. 19 illustrates the GUI 1640 with the newsworthy tab 1900 selected. The newsworthy tab 1900 is for displaying the top searches for news items which may be interesting to the user based on the user's personalization settings. This tab 1900 includes a top searches display areas 1905 for displaying the most active searches being performed in the CID. To view the stories of a particular search item, a user selects a particular search item 1910 in the top searches display area 1905 and invokes the search by selecting the search user interface item 1915. This will populate the stories display area 1920 with the related stories for the search. Selecting a story in the story display area will populate the display areas for news items, associations, and lifecycle of each story as previously discussed.

Figure 20:
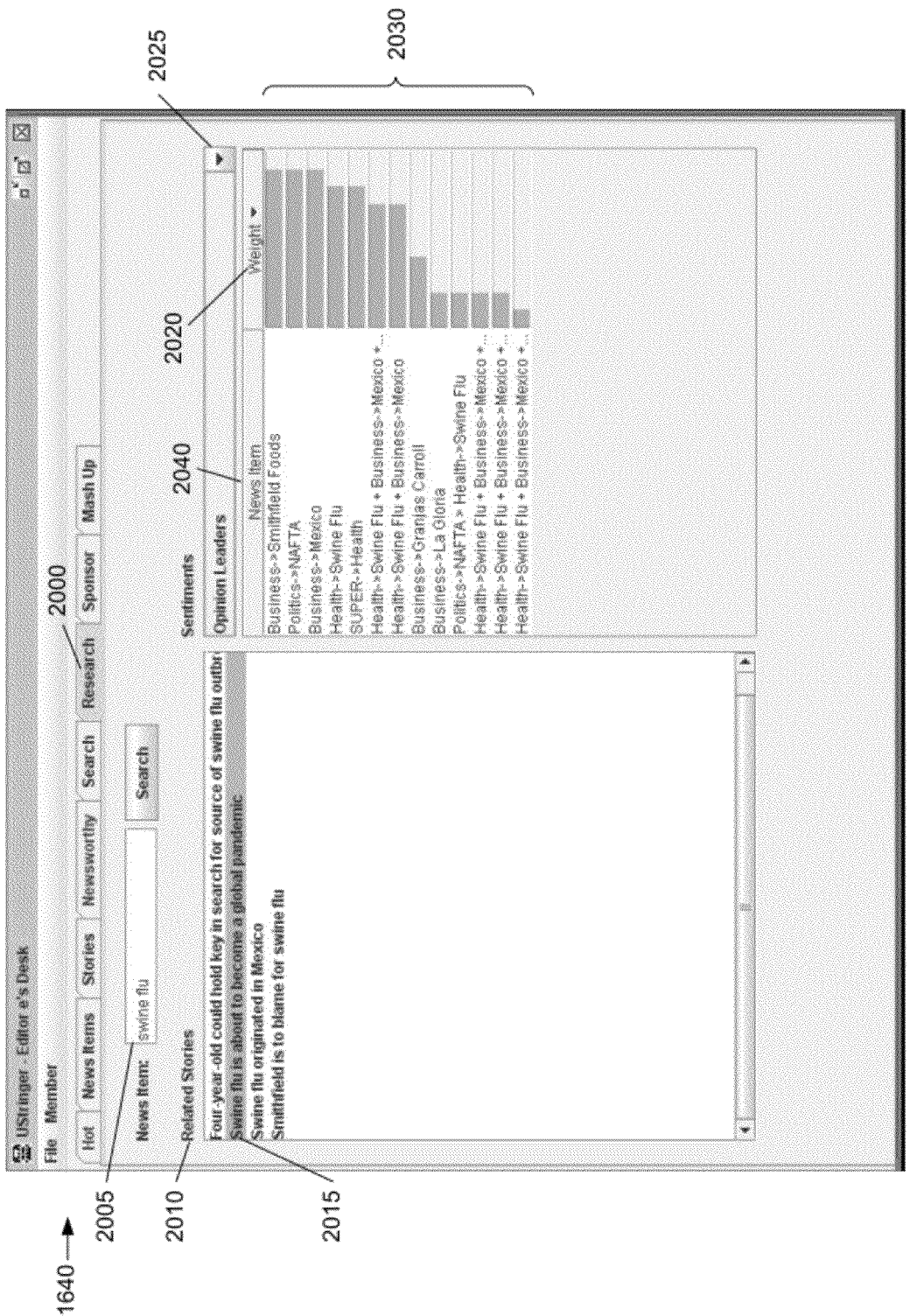
FIG. 20 illustrates a GUI of some embodiments for researching news items in the CID system.

FIG. 20 illustrates the GUI 1640 with the research tab 2000 selected. The research tab 2000 includes a search box 2005 for searching news items, a related stories display area 2010 for displaying the stories retrieved from a search, and a sentiment display area 2030 for displaying the views of different groups of members (e.g., content editors, opinion leaders, the public viewing the stories, etc). In the research tab 2000, a user first enters search criteria in the search box 2005. After a search is conducted, the related stories display area 2010 is populated. A user can then select a particular story 2015 which would populate the sentiment display area 2030 with the tags 2040 (i.e. news items) that have been associated to that particular story by a variety of users (e.g., content editors, opinion leaders, the public viewing the stories, etc). As shown, each tag is associated with a particular weight 2020. The calculation of this weight was discussed above in section II.C. From the sentiment display area 2030 a user can quickly view the opinions or feedback of how different user groups interpret the story's content.

Figure 21:
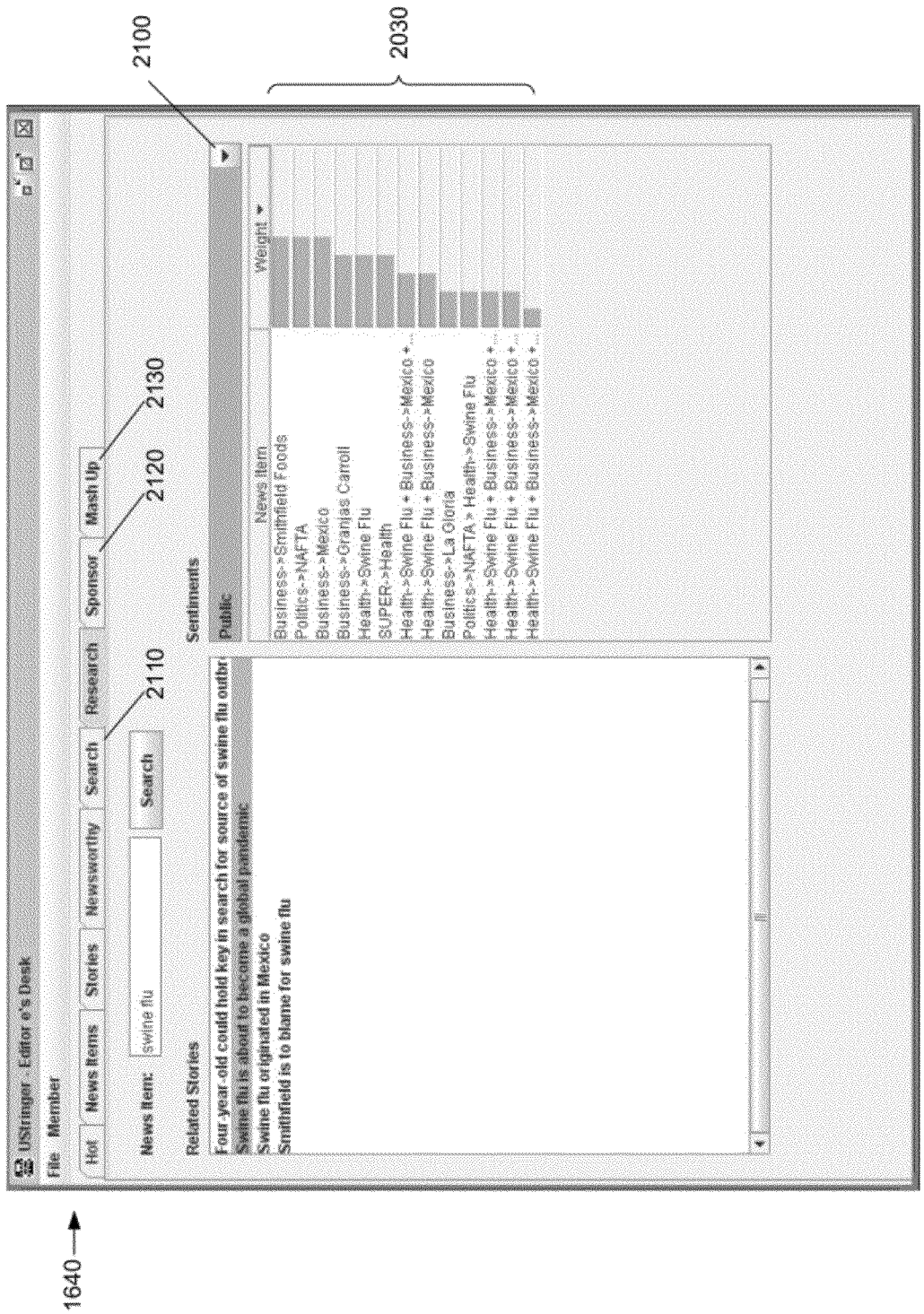
FIG. 21 illustrates a GUI of some embodiments illustrates a GUI of some embodiments for researching news items in the CID system.

As shows in FIG. 20, the feedback of the opinion leaders are combined and displayed in the sentiment display area 2025. A user can then use the drop down menu 2025 to select other categories of users and view their feedback regarding the story. The CID system can be configured in a variety of ways by site administrators so user categories can be arranged in many different permutations. As illustrated in FIG. 21, the feedback of the public who view the articles in circulation has been selected from the drop down menu 2100. Although end users (e.g. the public consumers of news) may not have full access to the functionality within the CID, they can be provided feedback modules on the websites of the content retrievers that purchase and display the news for the public. Such a feedback module can return the data to the CID system for analysis.

Other tabs not shown within the GUI can include a search tab 2110, a sponsor tab 2120 and mash-up tab 2130. The search tab 2110 allows a user to search for a particular story or news item and see all the details associated with it. Selection of a find news item or find story user interface item similar to the find story item 1815 of FIG. 18 would reveal this search tab 2120. An example of some search criteria can include key words, searches for particular content providers, or dates that content was created. The sponsor tab 2120 will display all the news items or tags that a member with sufficient affinity has been asked to sponsor by low affinity members who want to create the new tags to describe their content. From this tab, a member can elect to sponsor such tags or make alterations or suggestions to the tags, therefore partially sponsoring a proposed tag. Finally, the mash up tab 2130 allows a user to combine related news stories and end-consumer comments into a new news story. Specifically, a user can select multiple related stories and combine them to form a larger story that may describe a particular story in more detail or cover different aspects of a story that were not originally described.

Figure 22:
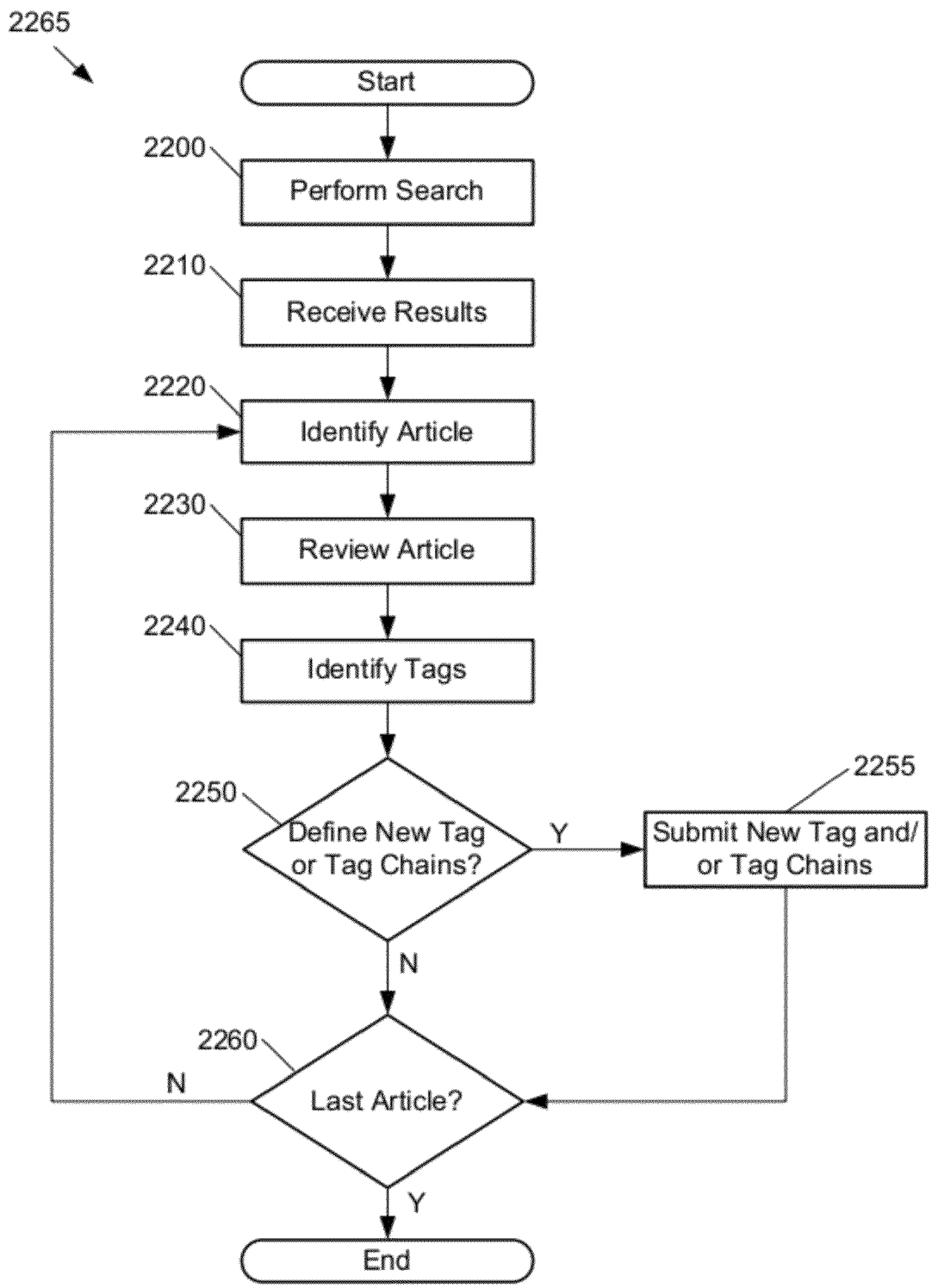
FIG. 22 illustrates a process which some embodiments perform to search, review, and modify tag associated with content.

FIG. 22 illustrates a process 2265 which some embodiments perform to search, review, and modify tag associated with content. The process is performed by a CID system in some embodiments. As shown, the process (at 2200) performs a search of the content within the CID system. In some embodiments, the search is performed based on a query received through a user using an interface (e.g., web interface, graphical user interface of the CID system, etc.). The process then (at 2210) receives the results of the retrieved content. These results can be displayed in a display area similar to the story display area 1805 of FIG. 18.

Next, the process (at 2220) identifies a particular content from the retrieved content. A selection of a piece of content is illustrated in FIG. 18 as a news story 1810. The process then (at 2230) reviews the identified content. This can entail viewing tags, associations, lifecycles of the content as well as the content itself. The process then (at 2250) determines whether a new tag and/or new tag chain is defined for the content. These new tags or tag chains come from other user as feedback and opinions of the content. When the determination is made that the new tag and/or new tag chain is defined, the process proceeds to 2255. Otherwise, the process proceeds to 2260. At 2255, the process submits new tag and/or tag chains for association with the identified content.

The process (at 2260) determines whether any more content has been identified in the search results. If more content is available in the search results and the content needs to be reviewed, the process returns to 2220. Otherwise, the process ends. The above examples have illustrated an exemplary GUI of a CID system for providing and delivering news content. The following section will describe the architecture and many components of a CID system that can be used to implement a trading platform for news content.

C. CID Architecture

Figure 23:
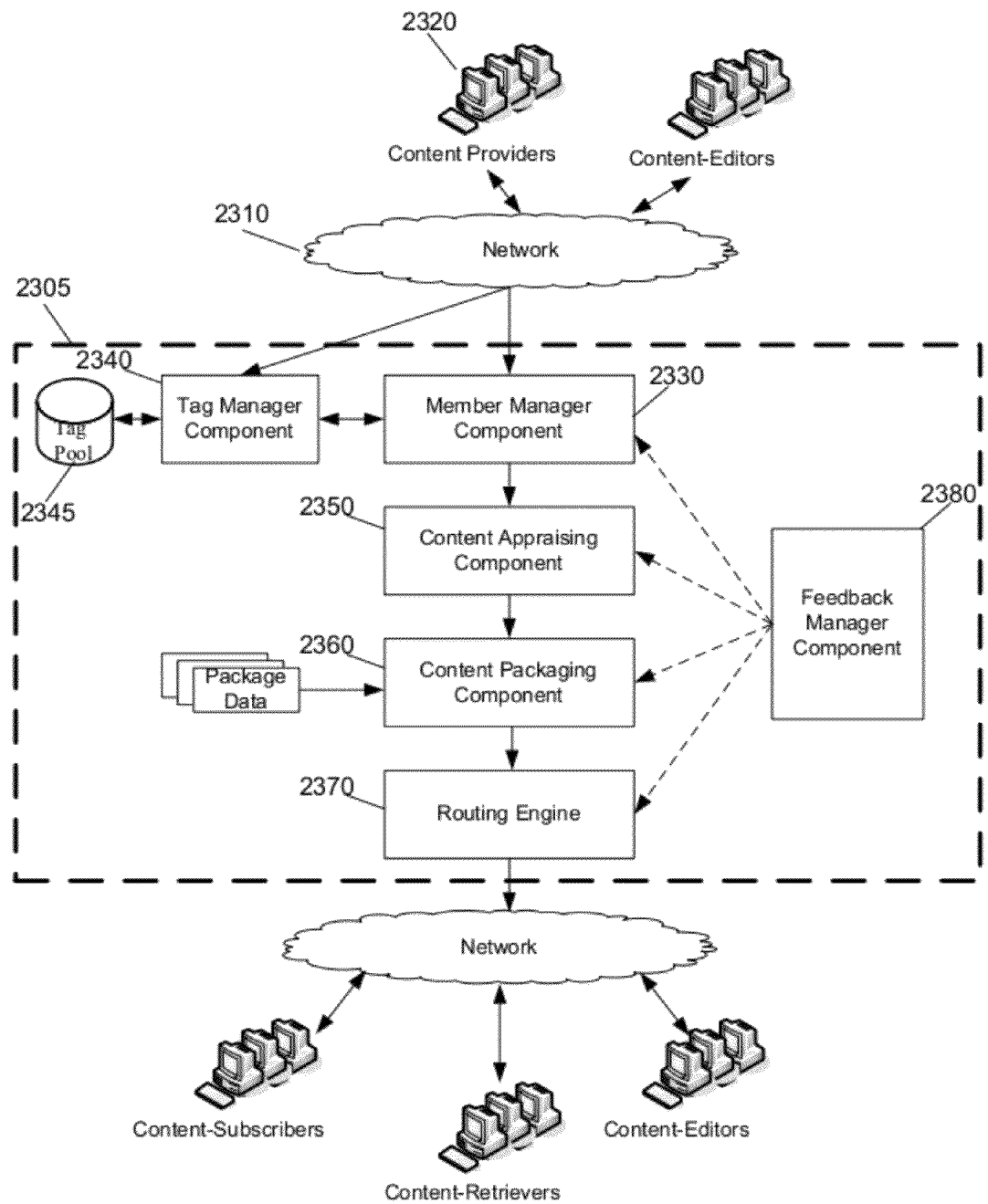
FIG. 23 presents a system architecture used by some embodiments to implement the CID platform for providing an online community for trading in news related content.

FIG. 23 presents a system architecture used by some embodiments to implement the Content Intelligence and Delivery (CID) Platform 2305 for providing an online community for trading content (e.g., news). As illustrated in FIG.

23, communications with the CID 2305 are facilitated through a network 2310 in which content from seller-members 2320 located anywhere with access to the network 2310 are able to participate within the online community.

In some embodiments, the network 2310 is any network or network of networks through which different devices access the various functionalities provided by the various components and engines of the CID 2305 described below. The network 2310 includes one or more of the following communication networks: the Internet, plain old telephone system (POTS), wireless data services (GPRS), local area network (LAN), wide area network (WAN), or other physical or wireless communication medium. In some embodiments, the CID 2305 is implemented using a Service Oriented Architecture (SOA). Using the SOA, some embodiments are capable of processing incoming information through two or more integrated interfaces. These interfaces include other applications, websites, or user interfaces. Additionally, in some embodiments, the various components and/or engines create the interfaces provided to users, such as seller-members, buyer-members, editor-members, and etc.

In this manner, the architecture of FIG. 23 permits the various users to be located anywhere throughout the world while still permitting such entities access to the services provided by the CID 2305 using a variety of different communication devices such as personal digital assistants (PDAs), computers, wireless smartphones, or any internet enabled device. Accordingly, the system interfaces unify all entities so that a single user accessing the system can interact with all other users accessing the system through a single interface regardless of its physical location throughout the world.

The functionality of the CID 2305 is provided via the various functional components and engines. In FIG. 23, the CID 2305 includes (1) a member manager component 2330, (2) a tag manager component 2340, (3) an associated tag pool 2345, (4) a content appraising component 2350, (5) a content packaging component 2360, (6) a routing engine 2370, and (7) a feedback manager component 2380. In some embodiments, one or more of the components or engines represent software processes executed by a processor of a computing device. In other embodiments, one or more of the components or engines represents physical hardware devices that implement the functionality described herein. It should be apparent to one of ordinary skill in the art that the various other functional components, engines, or modules may similarly be incorporated within the CID 2305.

i. Member Manager Component

In some embodiments, the member manager component 2330 scans the network 2310 electronically looking for content to classify and package for sale. In some such embodiments, the member manager component 2330 includes processes for analyzing the gathered data to distinguish news-related content from other contents, such as opinions, works of fiction, propaganda, etc. Furthermore, the member manager component 2330 is required to comply with all copyright issues reliably when gathering the content so as to properly identify the content producer. In some embodiments, the member manager component 2330 is a fully automated component whereas in other embodiments the component 2330 is one or more semantic web applications where the metadata is for acquiring the relevant data is mainly supplied by system administrators or users whom are members of one or more communities permitted to access the functionality of the CID 2305.

As noted above, different members of the community must be separated from one another in order to ensure content/intellectual property security and in order to protect from a "Silo Effect" whereby the content becomes overtaken by like-minded members who dominate the content in terms of contributions and commentary. However, by separating the members, some embodiments are able to provide a system with content that appeal to a wide audience whom will be accustomed to receiving their information through a personalized lens. As a result, some embodiments are able to route multiple views on the same stories/content to different publishers (i.e., buyer-members).

To provide such functionality, members are rated. Each member is provided an affinity score. For seller-members, this affinity score is chiefly determined based on feedback from buyer-members and their respective audience members. Editor-members rate one another; this is how the editor community is energized. A member's affinity score impacts what they can do within the system and the degree of importance placed on that member's input. For instance, a more valued buyer-member may be offered a "hot" story ahead of lesser valued members.

ii. Tag Manager Component

Figure 25:
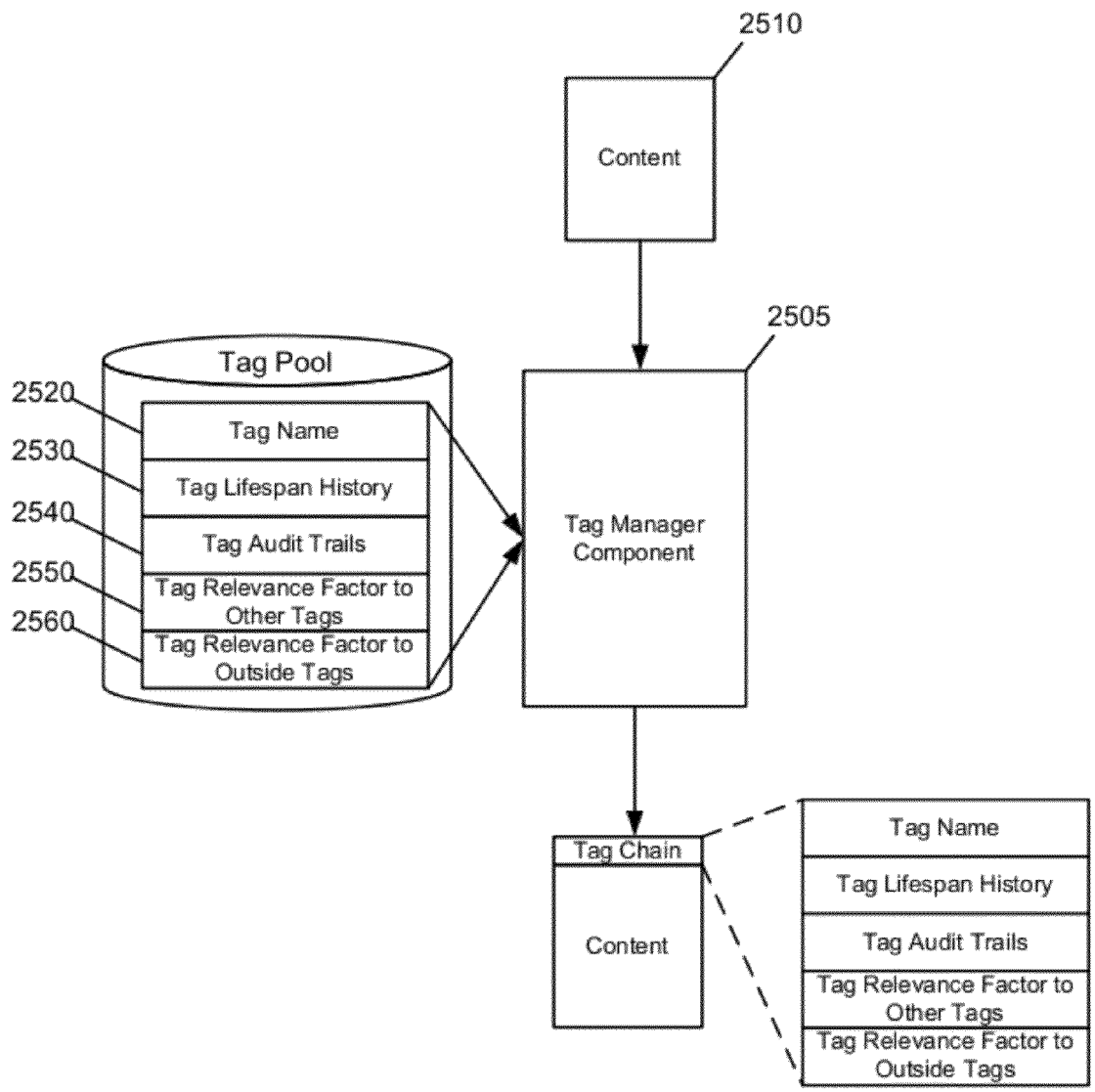
FIG. 25 illustrates some of the various components that a tag object may contain in accordance with some embodiments of the invention.

The tag manager of some embodiments was described in detail above. To supplement that discussion, the following FIGS. 25-25 provide a different perspective of the tag manager component of some embodiments. In some embodiments, gathered content is sorted and defined using one or more tags that form various tag chains for classifying and identifying the content. These tag chains encapsulate a more well-rounded definition of the content, as well as being declarations of knowledge, such as current events. Additionally, the tag chains provide a historical and ontological roadmap for the content whereby past associations and cross referenced material is easily locatable. As such, tags and tag chains are an integral part of the CID 2305.

Unlike most implementations of tags on the Internet today, the tag manager component 2340 manages the integrity of tags carefully. Most systems are very liberal about allowing their members/contributors to create tags at will. This leads to the creation of many duplicate tags, as well as tags that do not have any relevance to the topic. Within most systems tags are not monitored and garbage collected on regular intervals. However, within some embodiments of the CID 2305, tags are sacred and almost everything is assigned at least one tag representation. Subsequently analyzing the tags facilitates a news editor ability to decide what stories to cover where on the average news editors receive 1,000 news bulletins each day.

Figure 24:
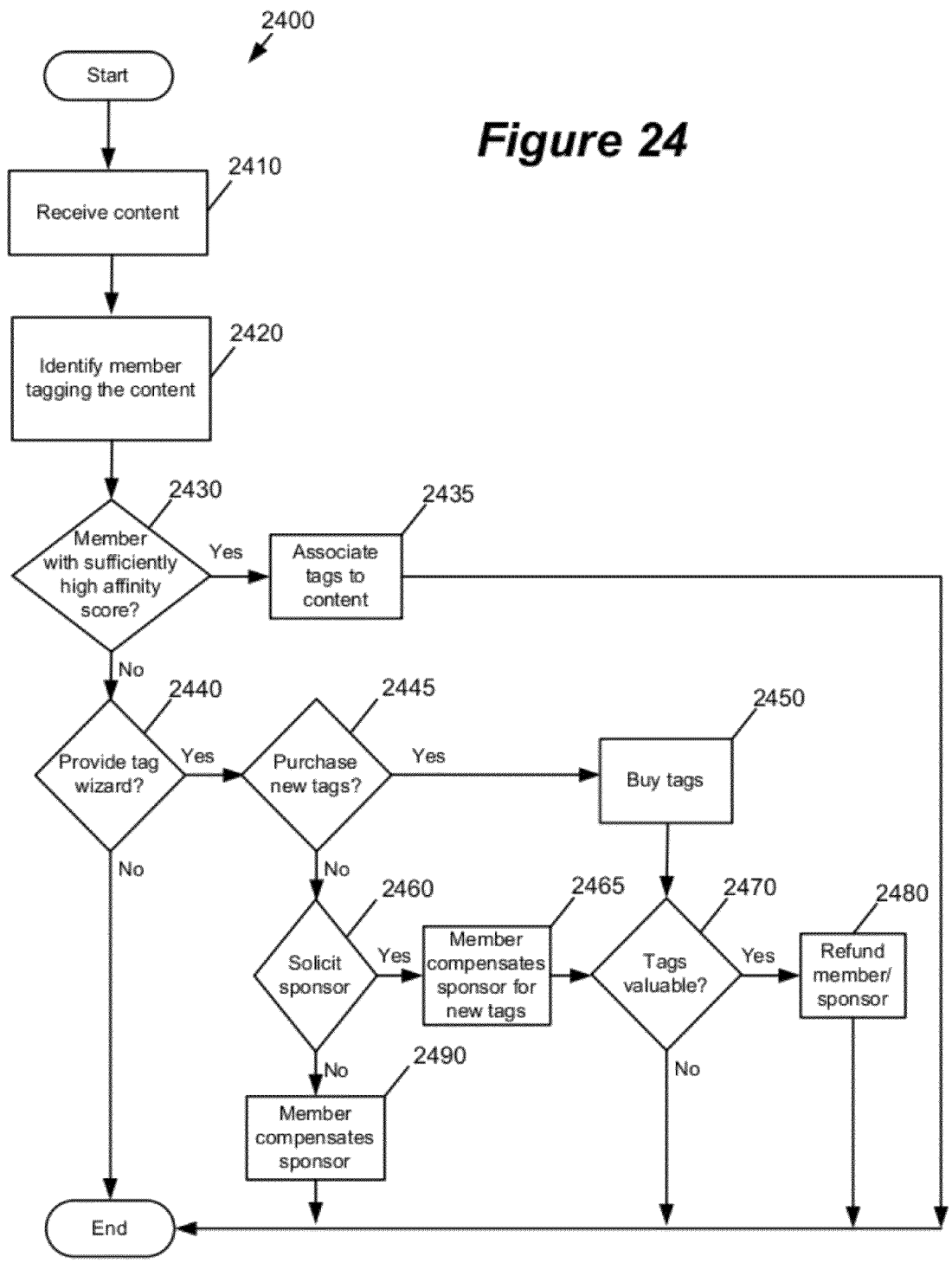
FIG. 24 presents a process with which some embodiments of the tag manager component associates one or more tag chains to a piece of content.

FIG. 24 presents a process 2400 with which some embodiments of the tag manager component 2340 associates one or more tag chains to a piece of content. The process 2400 begins by receiving (at 2410) content to be tagged. The process identifies (at 2420) the member attempting to tag the content. In some embodiments, the tag manager component 2340 seeds tags by editor-members and are only created by them or other members with high affinity scores. Accordingly, if the member posseses (at 2430) a sufficiently high affinity score, the process associates (at 2435) the tags to the content to create a tag chain. For example, content conveying information about the United States Supreme Court decision in Roe v. Wade may include the tags: "Supreme Court", "abortion", "right to choose", "Roe", and "Wade". These tags in and of themselves provide little to no information as to the content or finding the content from other content that may include the terms. However, by formulating the tag chain "Roe v. Wade, Supreme Court decision on women's right to choose for having an abortion", the content is easily identified and its relevancy can easily be classified amongst other related or unrelated content. Additionally, some embodiments may include "Super-tags" that provide a high-level classification for the piece of content. In the above example, the tag "abortion" may be used as a "Super-tag" to provide a first level of classification for the content.

If the member does not contain (at 2430) a sufficiently high affinity score, the process determines (at 2440) whether to present seller-members with a tag wizard (predictive tagging) thru which they can define their content. The tag wizard allows the user to specify one or more tag chains to define the content. Additionally, the tag wizard of some embodiments allows the user to specify tags associated with the content and to propose "Super-tags" for administrator approval. If the seller-member does not wish to use (at 2440) the tag wizard, the process ends. However, if a seller-member truly believes in the need to create a new set of tags or tag chains in order to better describe his/her content, and in essence have a better chance of getting it noticed, this member has two options. The first option is for the member to purchase (at 2445) a set of new tags or tag chains and specify the tags through the tag wizard. If the member so desires, the member purchases (at 2450) the new tags or tag chains and should the content prove (at 2470) to be valuable, the seller will be compensated (at 2480) for the purchase and the process ends. In some embodiments, purchasing tags includes paying a monetary value, whereas in other embodiments purchasing tags includes a point scale system where the points contain an intrinsic value within the CID.

The second option is for the member to solicit (at 2460) a sponsor within the community with a high enough affinity score whom would be willing to champion (at 2465) the new set of tags or tag chains. In this second scenario, the sponsor would be compensated by CID 2305 if the tags or tag chains are proven (at 2470) to be valuable, otherwise the seller-member compensates (at 2490) the sponsor and the process ends.

The tag manager component 2340 stores all tags and tag chains within the tag pool 2345. The tag pool 2345 may include one or more databases with associations such that similar content is provided similar tags. The most relevant tag chains are the "hottest" stories of the day, and live in the front sections of the pool 2345, whereas the lesser relevant tag chains (yesterday's news) live in the back of the pool 2345 and are eventually removed from the pool 2345 or are archived. It should be apparent to one of ordinary skill in the art that tags and tag chains are never thrown away. Instead, the tags and tag chains are archived for future analysis. One of the motivations behind tag archival is to create the historical or ontological roadmaps described above that provide an accurate and complete structure around its corresponding content. The outcome results in structured news.

Additionally, the tag manager component 2340 tries to determine the relevance of the tags and tag chains and how they are connected at any given time. One of the methods by which it does this, is to observe and learn from users' reactions to the tag wizard. Such a method may be complemented with other information such as a user's demographics when recording the reaction to the tag wizard. The tag manager component 2340 also scans and scrapes tags from popular sites on the Internet comparing them against the CID tag pool 2345. The tag chains which rise to the top may be viewed as electronically fact checked since by definition this is an implementation of the "Wisdom of the Crowds" principal. For instance, if a particular tag chain for a particular content is highly searched, then that particular chain is determined to adequately define the content. Similarly, the more a piece of content is referenced, the more interesting the content is determined to be or if enough patterns support a chain, then the subject matter explained by the chain is likely true or interesting. In this fashion, some embodiments provide one more layers of filtering and electronic content verification before content is passed on to the more traditional news media outlets.

Moreover, in order to ensure content intelligence accuracy, some embodiments scan content occasionally and results are matched with those of tag chains. The scanning operations will be performed more frequently on content submitted by lesser known seller-members.

FIG. 25 illustrates some of the various components that a tag object may contain in accordance with some embodiments of the invention. In this figure, the tag manager component 2505 associates to a content 2510 a tag chain containing: (1) a tag name 2520, (2) a tag lifespan history 2530, (3) tag audit trails 2540 (origin, who and how promoted/demoted the tag), (4) tag relevance factor to other tags 2550 (chiefly computed), and (5) tag relevance factor to outside tags 2560 (chiefly user defined).

Some embodiments provide direct access to the tag pool to editor member. Such access is valuable to a new class of members whom are interested in learning about the content more so than the content itself. By looking into the pool in an educated manner through reports and analysis, members can actually find out more about the current events and the underlying happenings behind the headlines. With certain vertical applications such as financial news, and those buyer-members generally interested in human behavioral trends, this added bonus will prove to be extremely valuable.

iii. Content Appraising Component

Figure 26:
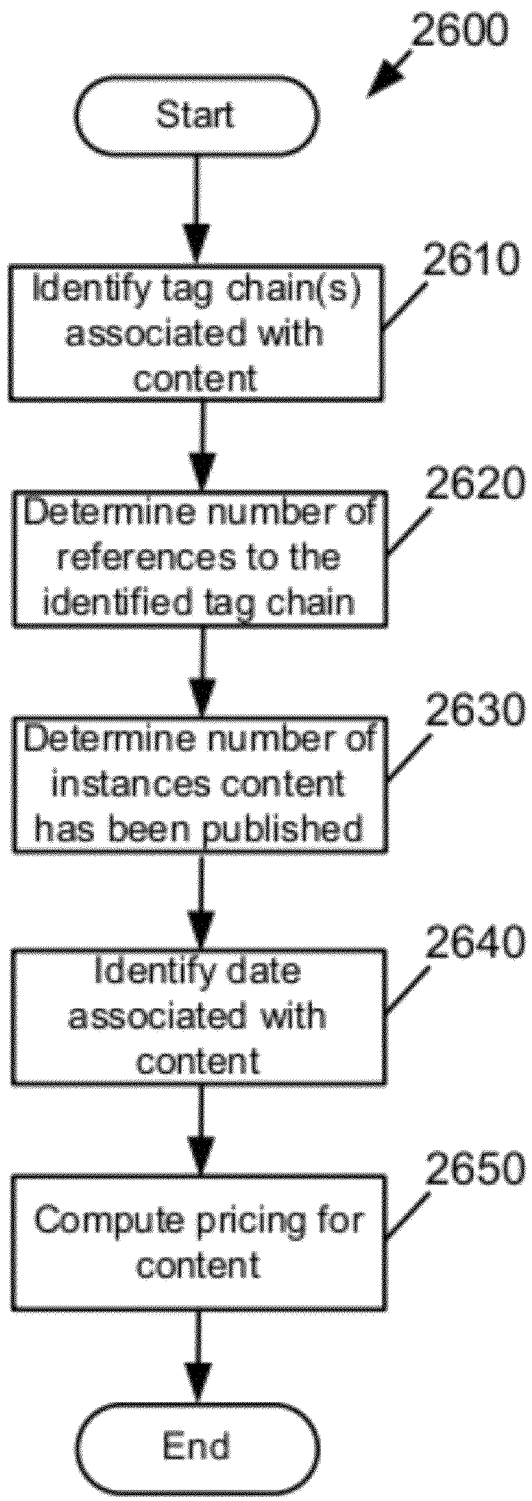
FIG. 26 presents a process performed by some embodiments of the content appraising component in order to appraise content over a given set of parameters.

The content coupled with its description in the form of one or more tag chains is evaluated by the content appraising component 2350 of some embodiments. The content appraising component appraises content using a variety of parameters. FIG. 26 presents a process 2600 performed by some embodiments of the content appraising component 2350 in order to appraise content over a given set of parameters.

The process 2600 begins by identifying (at 2610) one or more tag chain(s) associated with a piece of content to be appraised. The process determines (at 2620) how frequently the identified tag chain is searched and the number of instances the content has been published (at 2630). Additionally, the process identifies (at 2640) the date associated with the content being appraised. These parameters determine how the content is to be priced. For instance, the more a tag chain is referenced, the greater demand for the content and therefore the greater price that should be assigned to the content. Similarly, if a piece of content is published less, then the piece of content is more novel thus commanding a higher price. Similarly, newer content is likely to be more interesting to readers than outdated content, therefore the price for the newer content should be higher. The process then prices (at 2650) the content and the process terminates. It should be apparent to one of ordinary skill in the art that the above enumerated parameters in steps 2620-2640 present only an illustrative set of parameters and that additional or fewer parameters may be used by some embodiments to appraise content.

Figure 27:
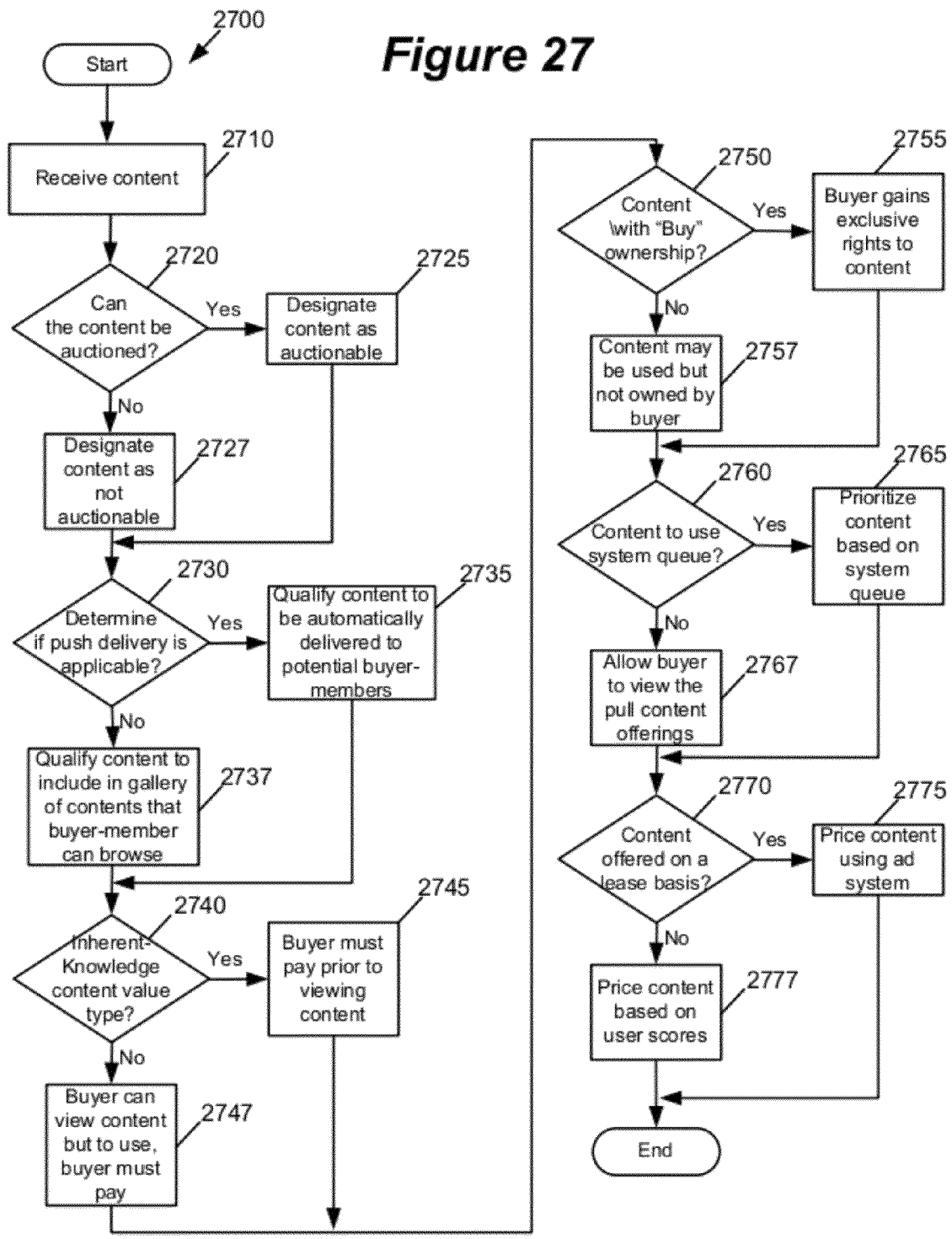
FIG. 27 presents a more detailed process performed by some embodiments of the content appraising component in order to appraise content over a given set of parameters.

FIG. 27 presents a more detailed process 2700 performed by some embodiments of the content appraising component 2350 in order to appraise content over a given set of parameters. The process 2700 begins by receiving (at 2710) content to be appraised. The process determines (at 2720) whether the content can be auctioned. Content that is judged to have timely knowledge value is likely to be designated (at 2725) as auction-able by the process 2700. An item that is deemed (at 2725) to be auction-able is assigned the following parameters: (1) length of auction (typically less than one hour, especially for push-auctions), (2) content teaser (seller-generated teasers are accepted from seller-members with high affinity scores, otherwise the teaser is system generated), (3) delivery mechanism (push/pull) where content that is auctioned is most often pushed, and (4) content value type where the content value type for auction-able items is most often inherent-knowledge.

Conversely, content that is not time-sensitive, but seems to contain a great deal of work-value would most likely be designated (at 2727) as not auction-able. An item that is deemed (at 2727) to not be auction-able is assigned the following parameters: (1) content value type where the content value type of inherent-knowledge necessitates a content teaser to be generated, whereas the content value type of work-value does not, and (2) delivery mechanism where pushed content is automatically delivered to buyer-members, whereas in the case of pulled content buyer-members are simply notified that potentially desirable content has been added to their queues.

The process then determines (at 2730) the delivery mechanism for the content. Content that is determined (at 2735) to be a push type content qualifies the content to be automatically delivered to potential buyer-members. Content that is determined (at 2737) to be a pull type content qualifies the content for being included in a gallery of contents that a buyer-member can browse and choose from. These and several other delivery mechanisms for monetizing content are described in further detail below in Section IV.

The process determines (at 2740) the content value type. The content value type represents the inherent-knowledge value or work-value of the content. For content determined to have inherent-knowledge value, the process requires (at 2745) a buyer-member to pay for the content prior to viewing the content. Additionally, content which is given this value type becomes the property of the buyer-member and may never be leased. For content determined to have work-value, the process allows (at 2747) a buyer-member to view the content but not to buy or use it (e.g., run it in their publication). However, if a buyer-member chooses to use this type of item, that member must pay for it. In some embodiments, the member pays for the content by becoming obligated to run an advertisement embedded with the content. In this manner, the member may actually make money as opposed to having to pay for the content.

In appraising the content, the process also determines (at 2750) ownership rights over the content. In other words, the process determines (at 2750) how the content is monetized. For instance, the process may designate (at 2755) the content with a buy designation whereby the content is being offered only for sale and that the buyer gains exclusive rights to the said content. Auctioned content most often receives this designation. Alternatively, the process may designate (at 2757) the content with a lease designation whereby the content may be used but may not be owned by the buyer-member. It should be apparent to one of ordinary skill in the art that in some embodiments the content appraising component offers different lease pricing models. One such example is an advertisement-based lease model.

Another parameter by which the process appraises (at 2760) content is via priority queues. The process implements (at 2765) system queues in order to prioritize content. These queues are tiered and can have sub-queues. The process also implements (at 2767) user queues for buyer-members to view the pull content offerings. The contents of these queues are also prioritized.

The process further appraises (at 2770) content based on pricing. If the content is being offered as leased and does not have inherent value, then the process does not need to price (at 2775) the content. Rather, the content is priced by an advertisement system as will be described in further detail below. In all other instances, the process prices (at 2777) the content. The price is computed based on a formula which takes into account the seller-member's affinity score whereby more famous journalists are paid a higher fee, editor-members' manipulation of parameters associated with the content, and the buyer-member's requirements and affinity score which may grant some customers discounts. For instance, content from more experienced and trusted seller-members are priced higher than content from lesser experienced and unknown seller-members.

Table (1) below outlines the possible permutations of content value type, ownership, auction-ability, pricing, and advertisement placement parameters.

TABLE 1

| Content Value Type | Ownership | Auctioned | Priced | Ad |
|---|---|---|---|---|
| inherent-knowledge | buy | √ | √ | |
| work-value | buy | √ | √ | |
| work-value | lease | | | √ | iv. Content Packaging Component

Figure 28:
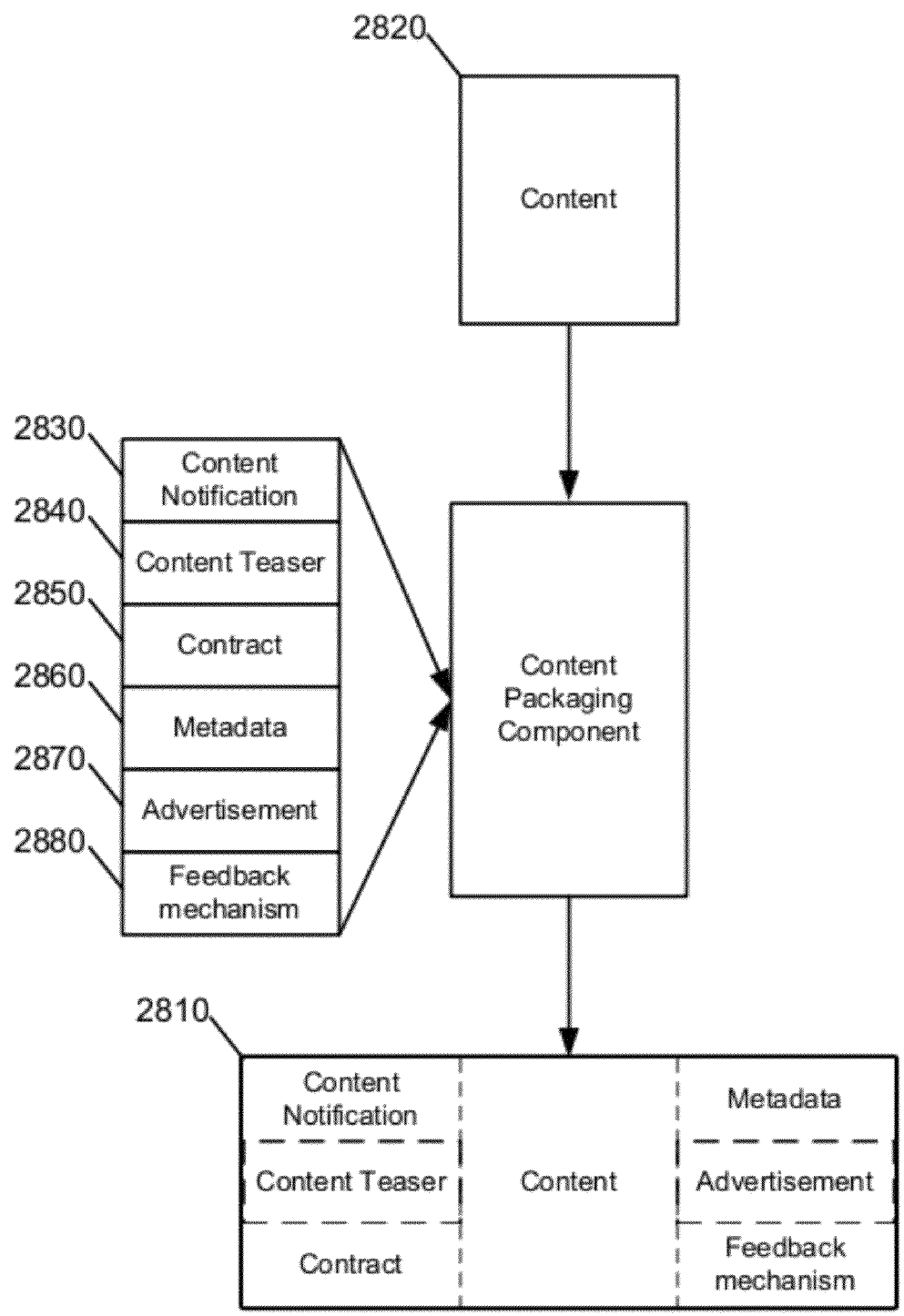
FIG. 28 illustrates a package that includes content and various other components to accompany the package.

Once a piece of content is understood (e.g., tagged and appraised), it is packaged by the content packaging component 2360 of the CID 2305 such that the content and the additional packaged information can be routed and delivered to potential buyer-member. Packaging content involves associating various pieces of information along with the content. For instance, FIG. 28 illustrates a package 2810 that includes: (1) the content 2820, (2) content notification 2830, (3) content teaser 2840, (4) contract 2850, (5) metadata 2860, (6) one or more embedded advertisements 2870, and (7) an embedded feedback mechanism 2880. It should be apparent to one of ordinary skill in the art the package of some embodiments may include additional elements in addition to those enumerated above or fewer elements.

In some embodiments, the actual content 2820 being packaged may or may not be encrypted. The content notification 2830 specifies wherein the content is to be pulled by buyer-member(s). The content teaser 2840 provides a short description for the content being packaged. In this manner, potential buyer-members will be able to view a short descriptive summary of the content without having to purchase or read the entire content.

As shown in FIG. 28, the package may also include the contract 2850. The contract 2850 specifies the usage rights associated with the content. Specifically, the contract covers the use and sale of the content offering. At one end of the spectrum, a buyer-member may be covered with a single blanket contract and at the other end of the spectrum, individual contracts may be used on per content offering basis for a single buyer-member. Contracts may or may not be encrypted.

Metadata 2860 describes the content. In some embodiments, the metadata is chiefly derived from the tag information. The buyer-member may choose to utilize this metadata in order to decide how best to utilize the content. For instance, the buyer-member may use the metadata to determine when, where, and how to publish the content. As a specific example, the buyer-member may use the metadata to determine whether the content should be a primary article or a supplemental piece.

The one or more embedded advertisements 2870 are provided within the package in instances where the content is being leased and the lease is not being paid for directly and all parties involved (the seller-member, the buyer-member, and CID) are all instead paid through advertising. CID implements the "PAID" advertisement system which leverages the insights available regarding the content and its producer(s) to better target advertisements. "PAID" also calculates the payment allocations in a more equitable fashion, taking into account the seller-member's affinity score and background.

The feedback mechanism 2880 that is embedded within the package solicits feedback from buyer-members. Some embodiments solicit feedback on a variety of content related parameters such as: (1) seller-member affinity, (2) content value type accuracy, (3) content pricing, (4) content metadata accuracy, and (5) targeting (personalization) accuracy. It should be apparent to one of ordinary skill in the art that in some embodiments additional or fewer parameters may be included within the feedback mechanism 2880.

Moreover, given the dynamics of digital media, what traditional news media outlets are discovering is that, it is no longer enough just to push content out, it is also important to engage people. Therefore, in some embodiments, within the package, supporting materials are supplied to provide ongoing discussions with the readers. These discussions typically take place within a bulletin board style forum.

v. Routing Engine

Once a content package has been constructed, it is ready to be targeted by the routine engine 2370. The routing engine 2370 is tasked with finding potential buyers for content offerings. In other words, the routing engine 2370 decides which buyer-members may be interested in a given content package. To do so, the routing engine 2370 takes into consideration the followings parameters: (1) prior buying patterns, (2) ongoing projects revealed to the system by buyer-members (e.g., wanted advertisements for particular news stories, related topics, and story leads), (3) organization type of the buyer-member being targeted (e.g. NY Times vs. The National Enquirer) matched against the content where the organization type itself is adjusted and kept up to date over time, and (4) prior experiences with the seller-member. In some embodiments, the routing engine 2370 is implemented using an industry standard personalization engine.

A content delivery bus is used in conjunction with the routing engine 2370 to target content for a potential buyer(s). For pushed content, an all inclusive and secure packaging is used in order to deliver the content, coupled with the metadata describing it to potential buyer-member(s). This package includes the contract governing the use of the packaged content (or a reference to it), and may also include an embedded advertisement for a content offering that is being leased.

vi. Feedback Manager Component

In some embodiments, the feedback manager component 2380 is provided to learn about the effectiveness of the CID's 2305 ability to accurately understand content, understand its buyer-member community (so that it can target them accurately for content offerings), and the quality of the content being sold through the system. This is accomplished by receiving feedback from multiple sources which include but are not limited to: (1) the editor-member community, (2) buyer-members (typically the professional staff employed by them), (3) the clients of buyer-members (the end-consumers of the content, e.g. news paper readers), and (4) the seller-member community.

In some embodiments, feedback is provided via an electronic interface. As noted above, feedback is provided for a set of different content related parameters. The feedback is controlled and normalized.

Once normalized, some embodiments of the feedback manager component 2380 provide the feedback back to the various components or engines of the CID 2305 such that each component or engine is able to adapt and fine tune its operations. In this manner, the CID 2305 automatically adapts the various components and engines of the CID 2305, such that the system continually improves the accuracy of its findings, tagging, appraising, and routing of content. Additionally, in some embodiments, some or all of the various rules and structure governing the operation. In this manner, the CID is unique from other online communities, because the CID permits its users to determine how the community will behave. It should be apparent to one of ordinary skill in the art that system administrators may also utilize the feedback data in order to improve the functionality of each of the various components or engines of the CID 2305.

IV. Monetization Models

Some embodiments support news-related content in multiple forms. Some such embodiments are thus able to provide an online community that is designed to support the trading of soft goods (intellectual property) in a variety of different manners. An appropriate monetization model is chosen electronically, once a news-related item being offered is classified by the system. The different monetization models provide different levels of access to the content. In this manner, some embodiments provide a community that is meaningful for both large scale and small scale seller-members and buyer-members. Specifically, a first monetization model may be appropriate for a large scale seller-member that utilizes many resources to gather the content to be sold and a second monetization model may be appropriate for a small scale seller-member that has limited resources and provides content that is more "rough" or less detailed. Some monetization models employed by some embodiments of the invention include: (1) push-auction, (2) pull-auction, (3) push-buy, (4) pull-buy, (5) push-lease, and (6) pull-lease.

It should be apparent to one of ordinary skill in the art that the above enumerated monetization models are meant to provide only an illustrative set of the possible monetization models that may be implemented within some embodiments of the invention. Additionally, some embodiments permit users to custom tailor the monetization models such that newer models may be introduced at any time. Accordingly, some embodiments provide an interface from which customizations to the monetization models may be specified or from which entirely new monetization models may be specified.

A. Push-Auction

Push auctions are auction events where a pre-determined audience of buyer-members is invited to participate in an online auction. Content which has time value is often sold in this fashion. A pre-auction notification is sent by the CID system in order to alert buyer-members in advance of the commencement of the auction. These auctions are concluded in minutes/hours and not days. The winner of a push-auction takes exclusive ownership of the content at the conclusion of the auction.

B. Pull-Auction

Pull auctions are eBay® style auctions where buyer-members browse the website provided by the community of some embodiments for content items being auctioned. Content pieces which are auction-able but do not have any particular time value are auctioned in this fashion. Potential buyer-members are notified when there is a new item being auctioned. The content being auctioned is placed in each potential buyer's queue, note unlike eBay® where all buyers can view all items for sale, buyer-members can only view what has been placed in their own queues. This is to ensure that content items being offered (pieces of intellectual property) are not compromised. Unlike push-auctions, pull-auctions are kept open for longer periods of time. The winner of a pull-auction takes exclusive ownership of the content at the conclusion of the auction.

C. Push-Buy

In push-buy offerings, content items are directly sent to a single individual buyer-member. The buyer-member is given a period of time to accept the offering. If the member accepts the contract which is embedded in the offering, the content becomes the property of that buyer-member exclusively. However, if the member rejects the offering, CID selects an alternative buyer-member and restarts the process. This process is reiterated until a buyer has been found for the content. If all potential buyer-members selected are exhausted within one full cycle; CID automatically restructures the offering to make it more attractive for the subsequent cycle.

D. Pull-Buy

The pull-buy model is essentially used to sell a limited number of copies of one item. A limited number of potential buyer-members are invited to buy the item. The item will not be sold outside of this audience.

E. Push-Lease

The lease model is similar to the syndication model in use in the news media today. A buyer-member may choose to publish the content offering. The buyer-member does not have to pay to publish the content, instead the buyer-member agrees to run the embedded advertisement coupled with the content and actually makes money. The advertisement revenue pays for all three parties, the seller-member, the buyer-member, and CID. In the push-lease model a package containing the content, a legal contract, and the embedded advertisement is sent to a list of targeted buyer-members.

F. Pull-Lease

This model is the same as the push-lease model however, instead of the content package being sent to potential buyer-members, targeted buyer-members are alerted to its availability, and can fetch it at their convenience from their individual queues.

V. Different Implementation of a CID System

Multiple embodiments of a CID system have been described in the preceding sections through a variety of different modules and components within a CID system. For example, a CID system can comprise content appraising components, content packaging components, and tag manager component that can include tag processors, tag score calculators, query managers, etc. For some embodiments of a CID system, these components and modules can all be implements as one service provided by one service provider at one central location. One or more of these modules could also be performed locally on private networks. Yet another implementation can include selling or licensing a CID system tailored for different institutions (e.g. news agencies). In such an implementation one or more of the described components may not be necessary. Although many features described above have also referenced an online community, many of the features of some embodiments can be implemented in offline settings and environments. Based on the examples above, one of ordinary skill in the art would recognize that a CID system could be executed in whole or in part on several combinations of computing resources.

VI. Computer System

Many of the above-described CID components and engines are implemented as software processes that are specified as a set of instructions recorded on a machine readable medium (also referred to as computer readable medium). When these instructions are executed by one or more computational element(s) (such as processors or other computational elements like ASICs and FPGAs), they cause the computational element(s) to perform the actions indicated in the instructions. Computer is meant in its broadest sense, and can include any electronic device with a processor. Examples of computer readable media include, but are not limited to, CD-ROMs, flash drives, RAM chips, hard drives, EPROMs, etc.

In this specification, the term "software" is meant in its broadest sense. It can include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention.

Figure 29:
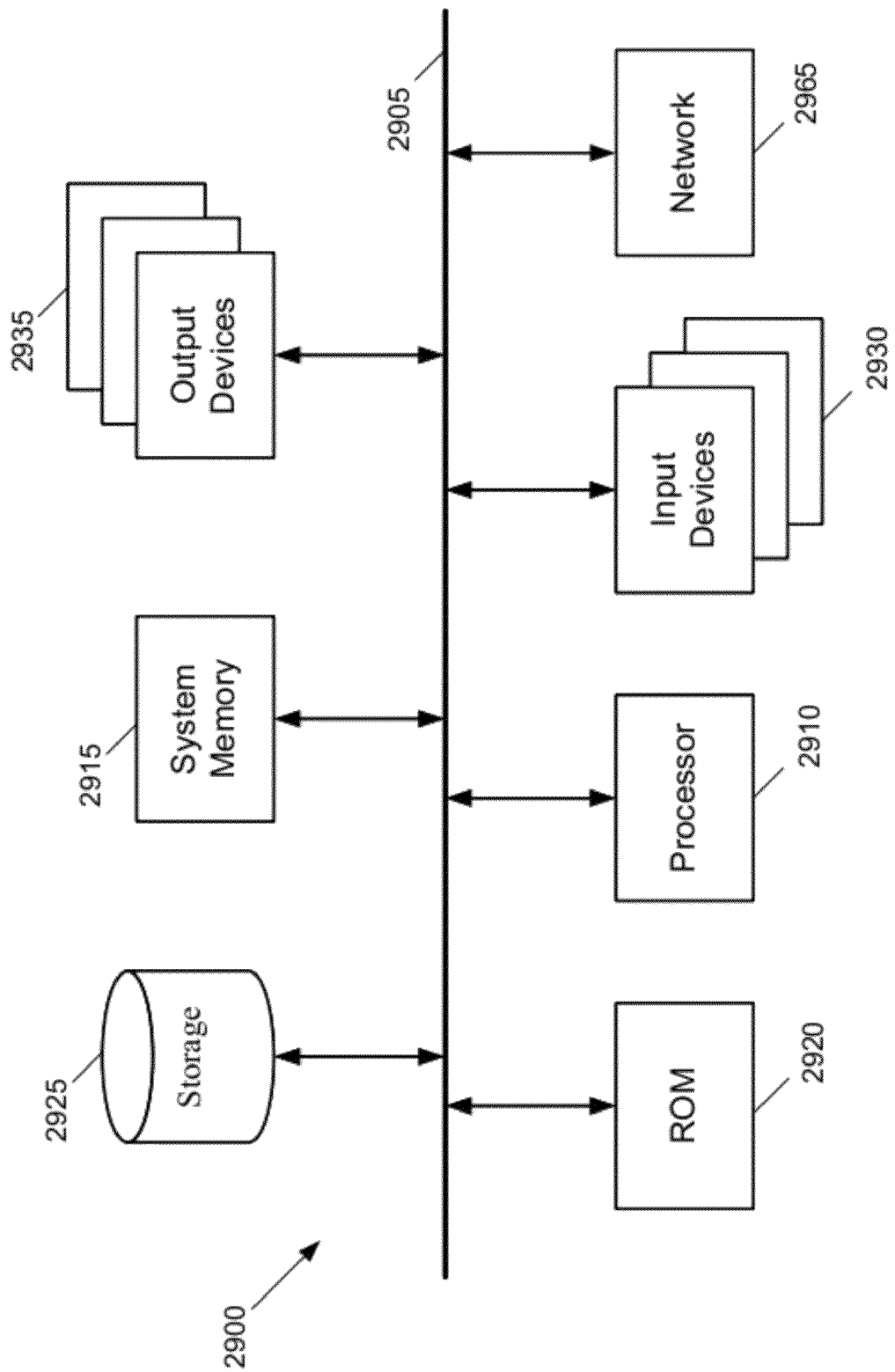
FIG. 29 illustrates a computer system with which some embodiments of the invention are implemented.

FIG. 29 illustrates a computer system with which some embodiments of the invention are implemented. Computer system 2900 includes a bus 2905, a processor 2910, a system memory 2925, a read-only memory 2930, a permanent storage device 2935, input devices 2940, and output devices 2945.

The bus 2905 collectively represents all system, peripheral, and chipset buses that communicatively connect the numerous internal devices of the computer system 2900. For instance, the bus 2905 communicatively connects the processor 2910 with the read-only memory 2930, the system memory 2925, and the permanent storage device 2935. From these various memory units, the processor 2910 retrieves instructions to execute and data to process in order to execute the processes of the invention.

The read-only-memory (ROM) 2930 stores static data and instructions that are needed by the processor 2910 and other modules of the computer system. The permanent storage device 2935, on the other hand, is a read-and-write memory device. This device is a non-volatile memory unit that stores instructions and data even when the computer system 2900 is off. Some embodiments of the invention use a mass-storage device (such as a magnetic or optical disk and its corresponding disk drive) as the permanent storage device 2935.

Other embodiments use a removable storage device (such as a floppy disk or ZIP® disk, and its corresponding disk drive) as the permanent storage device. Like the permanent storage device 2935, the system memory 2925 is a read-and-write memory device. However, unlike storage device 2935, the system memory is a volatile read-and-write memory, such a random access memory. The system memory stores some of the instructions and data that the processor needs at runtime. In some embodiments, the invention's processes are stored in the system memory 2925, the permanent storage device 2935, and/or the read-only memory 2930. Together or separate, the above mentioned memories and storage devices comprise the computer readable medium of the computer system on which the above described processes are stored and executed from, the content, tags, and tag chains used by the processes are stored.

The bus 2905 also connects to the input and output devices 2940 and 2945. The input devices enable the user to communicate information and select commands to the computer system. The input devices 2940 include alphanumeric keyboards and pointing devices. The output devices 2945 display images generated by the computer system. For instance, these devices display a graphical user interface. The output devices include printers and display devices, such as cathode ray tubes (CRT) or liquid crystal displays (LCD).

Finally, as shown in FIG. 29, bus 2905 also couples computer 2900 to a network 2965 through a network adapter (not shown). In this manner, the computer can be a part of a network of computers (such as a local area network ("LAN"), a wide area network ("WAN"), or an Intranet, or a network of networks, such as the internet. For example, the computer 2900 may be coupled to a web server (network 2965) so that a web browser executing on the computer 2900 can interact with the web server as a user interacts with a graphical user interface that operates in the web browser. Any or all components of computer system 2900 may be used in conjunction with the invention.

While the invention has been described with reference to numerous specific details, one of ordinary skill in the art will recognize that the invention can be embodied in other specific forms without departing from the spirit of the invention. For instance, a person of ordinary skill in the art would realize that the invention may be practiced in several different operating environments such as Microsoft Windows®, UNIX®, Linux, etc.

What is claimed:

1. A non-transitory computer readable medium storing a computer program that when executed by at least one processor causes a computing device to tag content, said computer program comprising:
    a set of instructions for receiving specification of a tag chain from a user, said tag chain comprising a set of one or more tags that describe the content; a set of instructions for associating the tag chain to the content;
    a set of instructions for identifying the user that specified the tag chain, wherein different users are associated with different affinity scores;
    a set of instructions for specifying a weight relating to the trustworthiness of the tag chain based on the identified user by calculating the weight at least partially based on an affinity score associated with the user, wherein only users with a particular affinity score above a threshold value are able to specify tag chains;
    a set of instructions determining that the user's affinity score is above the threshold value; and
    a set of instructions for enabling the user to specify the tag chain based on the determination.

2. The non-transitory computer readable medium of claim 1, wherein the computer program further comprises a set of instructions for allowing a particular user to search a sponsor for or to purchase one or more tags when the particular user's affinity score is not above the threshold value.

3. The non-transitory computer readable medium of claim 1, wherein the tag chain is specified using a tag collection, wherein the computer program further comprises a set of instructions for determining whether the user is able to add additional tags to the tag collection based on the user's affinity score.

* * * * *